US010559065B2

(12) United States Patent
Okayama et al.

(10) Patent No.: US 10,559,065 B2
(45) Date of Patent: Feb. 11, 2020

(54) INFORMATION PROCESSING APPARATUS AND INFORMATION PROCESSING METHOD

(71) Applicant: SONY CORPORATION, Tokyo (JP)

(72) Inventors: Takahiro Okayama, Tokyo (JP); Kazuomi Kondo, Kanagawa (JP); Ryo Fukazawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 92 days.

(21) Appl. No.: 15/559,904

(22) PCT Filed: Feb. 3, 2016

(86) PCT No.: PCT/JP2016/000558
§ 371 (c)(1),
(2) Date: Sep. 20, 2017

(87) PCT Pub. No.: WO2016/157677
PCT Pub. Date: Oct. 6, 2016

(65) Prior Publication Data
US 2018/0096461 A1    Apr. 5, 2018

(30) Foreign Application Priority Data

Mar. 31, 2015    (JP) .................. 2015-072187

(51) Int. Cl.
*G06K 9/00*    (2006.01)
*G06T 5/00*    (2006.01)
(Continued)

(52) U.S. Cl.
CPC .......... *G06T 5/001* (2013.01); *G06K 9/00302* (2013.01); *G06T 7/10* (2017.01); *G06T 11/001* (2013.01)

(58) Field of Classification Search
CPC ..... G06T 5/001; G06T 11/001; G02B 27/017; G02B 2027/0147; G06K 9/00302; G09G 2340/0407; G09G 2310/0232
See application file for complete search history.

(56) References Cited

U.S. PATENT DOCUMENTS 7,076,118 B1 *    7/2006    Westerman ........ G06K 9/00597
                                                 345/157
8,218,895 B1 *    7/2012    Gleicher ............... G06T 3/0025
                                                 345/427
(Continued)

FOREIGN PATENT DOCUMENTS

CA    2666692 A1    4/2008
CN    101542584 A    9/2009
(Continued)

OTHER PUBLICATIONS

International Search Report and Written Opinion of PCT Application No. PCT/JP2016/000558, dated Apr. 26, 2016, 09 pages of ISRWO.

(Continued)

*Primary Examiner* — Aaron W Carter
(74) *Attorney, Agent, or Firm* — Chip Law Group

(57) ABSTRACT

An information processing apparatus includes a user information obtaining unit and a high-image-quality area control unit. The user information obtaining unit obtains detected user information on a user, the user information excluding gaze information. The high-image-quality area control unit determines a high-image-quality area on the basis of the user information, a quality of an image displayed in the high-image-quality area being higher than a quality of an image displayed in an area other than the high-image-quality area in an entire area of a display viewed by the user.

13 Claims, 17 Drawing Sheets

(51) Int. Cl.
*G06T 7/10* (2017.01)
*G06T 11/00* (2006.01)

(56) References Cited

U.S. PATENT DOCUMENTS

| | | | | |
|---|---|---|---|---|
| 8,958,662 B1* | 2/2015 | Grosz | | G06T 3/4038 382/118 |
| 8,990,672 B1* | 3/2015 | Grosz | | G06F 17/212 715/202 |
| 9,077,823 B1* | 7/2015 | Grosz | | H04N 1/00177 |
| 9,507,506 B2* | 11/2016 | Grosz | | G06F 3/1243 |
| 9,659,218 B1* | 5/2017 | Shetty | | G06K 9/00744 |
| 10,097,851 B2* | 10/2018 | Lee | | H04N 19/513 |
| 10,163,227 B1* | 12/2018 | Lester | | G06T 9/002 |
| 2006/0045381 A1* | 3/2006 | Matsuo | | H04N 19/139 382/276 |
| 2006/0126093 A1* | 6/2006 | Fedorovskaya | | G06K 9/00255 358/1.14 |
| 2007/0132663 A1* | 6/2007 | Iba | | G06F 3/013 345/8 |
| 2008/0062291 A1* | 3/2008 | Sako | | G02B 27/0093 348/294 |
| 2008/0193048 A1* | 8/2008 | Sun | | G06T 11/60 382/284 |
| 2008/0285800 A1* | 11/2008 | Miyake | | H04N 5/44 382/103 |
| 2009/0086024 A1* | 4/2009 | Brookins | | H04N 5/23229 348/143 |
| 2009/0128644 A1* | 5/2009 | Camp, Jr. | | G06T 3/4038 348/218.1 |
| 2010/0067863 A1* | 3/2010 | Wang | | G11B 27/034 386/279 |
| 2010/0085462 A1 | 4/2010 | Sako et al. | | |
| 2010/0284471 A1* | 11/2010 | Tsai | | H04N 19/70 375/240.24 |
| 2010/0295872 A1 | 11/2010 | Uchida et al. | | |
| 2011/0019910 A1* | 1/2011 | Kameyama | | G06T 5/50 382/163 |
| 2011/0102641 A1* | 5/2011 | Iwasaki | | G06T 3/40 348/240.99 |
| 2011/0200270 A1* | 8/2011 | Kameyama | | G06T 1/00 382/260 |
| 2011/0229012 A1* | 9/2011 | Singhal | | G06K 9/00201 382/154 |
| 2012/0124456 A1* | 5/2012 | Perez | | G06Q 30/02 715/200 |
| 2012/0324491 A1* | 12/2012 | Bathiche | | H04H 60/33 725/10 |
| 2013/0058579 A1* | 3/2013 | Kawanishi | | G06K 9/00228 382/195 |
| 2013/0084013 A1* | 4/2013 | Tang | | G06K 9/4671 382/195 |
| 2013/0091515 A1* | 4/2013 | Sakata | | H04N 17/04 725/10 |
| 2013/0156320 A1* | 6/2013 | Fredembach | | G06K 9/46 382/190 |
| 2013/0251266 A1* | 9/2013 | Nakagome | | G06K 9/00657 382/195 |
| 2014/0064578 A1* | 3/2014 | Choe | | G06K 9/3233 382/128 |
| 2014/0152688 A1 | 6/2014 | Sako et al. | | |
| 2014/0160129 A1* | 6/2014 | Sako | | G06F 3/011 345/427 |
| 2014/0269910 A1* | 9/2014 | Chai | | H04N 19/117 375/240.06 |
| 2014/0298276 A1 | 10/2014 | Yokoyama et al. | | |
| 2014/0307971 A1* | 10/2014 | Hanzawa | | G06T 3/4053 382/195 |
| 2014/0359656 A1* | 12/2014 | Banica | | H04N 21/812 725/32 |
| 2015/0082349 A1* | 3/2015 | Ishtiaq | | H04N 21/23418 725/40 |
| 2015/0092983 A1* | 4/2015 | Nguyen | | G06F 3/013 382/103 |
| 2015/0103202 A1* | 4/2015 | Otsuki | | H04N 1/32101 348/231.2 |
| 2015/0235427 A1* | 8/2015 | Nobori | | G06T 19/006 345/629 |
| 2015/0268471 A1 | 9/2015 | Sako et al. | | |
| 2016/0005176 A1* | 1/2016 | Nguyen | | G06F 3/013 382/103 |
| 2016/0165233 A1* | 6/2016 | Liu | | G06T 11/60 382/251 |
| 2016/0191891 A1* | 6/2016 | Gilpin | | H04N 5/77 386/224 |
| 2016/0248988 A1* | 8/2016 | Urfalioglu | | H04N 5/2258 |
| 2016/0261787 A1* | 9/2016 | Urfalioglu | | H04N 5/2258 |
| 2016/0284129 A1* | 9/2016 | Nishizawa | | G06F 3/013 |
| 2016/0301865 A1* | 10/2016 | Rekimoto | | H04N 5/225 |
| 2016/0309081 A1* | 10/2016 | Frahm | | G06F 3/013 |
| 2017/0193633 A1* | 7/2017 | Narita | | G06F 3/048 |
| 2017/0193970 A1* | 7/2017 | Takahashi | | G09G 5/36 |
| 2017/0351327 A1* | 12/2017 | Yasuda | | G06F 3/012 |
| 2017/0359580 A1* | 12/2017 | Su | | H04N 19/103 |
| 2017/0371408 A1* | 12/2017 | Wilson | | A61B 5/02438 |
| 2017/0371898 A1* | 12/2017 | Sharma | | G06F 3/04842 |
| 2018/0063384 A1* | 3/2018 | Kudo | | G06F 3/16 |
| 2018/0096461 A1* | 4/2018 | Okayama | | G06T 7/10 |
| 2018/0189928 A1* | 7/2018 | Vaquero | | G06F 3/0485 |
| 2018/0234661 A1* | 8/2018 | Tsukahara | | G06F 3/0487 |
| 2018/0280762 A1* | 10/2018 | Tsukahara | | A63B 24/0062 |

FOREIGN PATENT DOCUMENTS

| | | |
|---|---|---|
| CN | 101894531 A | 11/2010 |
| CN | 103399403 A | 11/2013 |
| EP | 2081182 A1 | 7/2009 |
| EP | 2787500 A1 | 10/2014 |
| JP | 2007-142542 A | 6/2007 |
| JP | 2008-096867 A | 4/2008 |
| JP | 2010-211017 A | 9/2010 |
| JP | 2010-271343 A | 12/2010 |
| KR | 10-2009-0069335 A | 6/2009 |
| KR | 10-2010-0124667 A | 11/2010 |
| TW | 200834536 A | 8/2008 |
| TW | 201112205 A | 4/2011 |
| WO | 2008/047889 A1 | 4/2008 |
| WO | 2013/080444 A1 | 6/2013 |

OTHER PUBLICATIONS

International Preliminary Report on Patentability of PCT Application No. PCT/JP2013/006280, dated Jul. 9, 2015, 13 pages.

* cited by examiner

| Behavior information | Reduction ratio |
|---|---|
| Stop (0cm/second~5cm/second) | 1 |
| Walk (5cm/second~20cm/second) | 1/2 |
| Run (20cm/second~) | 1/3 |

143

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2016/000558 filed on Feb. 3, 2016, which claims priority benefit of Japanese Patent Application No. JP 2015-072187 filed in the Japan Patent Office on Mar. 31, 2015. Each of the above-referenced applications is hereby incorporated herein by reference in its entirety.

TECHNICAL FIELD

The present technology relates to an information processing apparatus that processes information to display a high-quality image in part of the area of a display and to display a low-quality image in the other area of the display, an information processing method, and a program.

BACKGROUND ART

There is known a video presentation apparatus, which recognizes the field of view of a person watching a video, generates a video, the resolution of the center area of the field of view being different from that of the surrounding area, and presents the video on a display device that the person watches (for example, see claim 1 of Patent Literature 1.).

CITATION LIST

Patent Literature

Patent Literature 1: Japanese Patent Application Laid-open No. 2013-186254

DISCLOSURE OF INVENTION

Technical Problem

It is desirable for such an apparatus to be further user-friendly since such an apparatus acts on the visual sense of a user directly.

In view of the above-mentioned circumstances, it is an object of the present technology to provide a user-friendly information processing apparatus, an information processing method, and a program.

Solution to Problem

According to an embodiment of the present technology, an information processing apparatus includes a user information obtaining unit and a high-image-quality area control unit. The user information obtaining unit is configured to obtain detected user information on a user, the user information excluding gaze information. The high-image-quality area control unit is configured to determine a high-image-quality area on the basis of the user information, a quality of an image displayed in the high-image-quality area being higher than a quality of an image displayed in an area other than the high-image-quality area in an entire area of a display viewed by the user.

According to the present embodiment, it is possible to determine the high-image-quality area appropriate to the user information.

The high-image-quality area control unit may be configured to determine a size of the high-image-quality area on the basis of the user information.

By reducing the size of the high-image-quality area, the entire rendering processing amount is reduced, and the lifetime of the information processing apparatus is made longer. By reducing the size of the high-image-quality area on the basis of the user information, a user may not feel visually uncomfortable.

The user information may include at least one of biological-body information on a user, behavior information on a user, and environment information on an environment around a user.

The visual performance of a person changes affected by biological stress, motional stress, and environmental stress. According to the present embodiment, the information processing apparatus predicts the visual performance of a user on the basis of at least one of biological-body information on a user, behavior information on a user, and environment information on an environment around a user, and dynamically changes the size of the high-image-quality area depending on the predicted visual performance. As a result, a user may not feel visually uncomfortable.

The information processing apparatus may further include an image-quality control unit configured to determine an image quality of a surrounding area on the basis of the user information, the surrounding area being an area of the entire area excluding the high-image-quality area.

According to the present embodiment, the information processing apparatus lowers the image quality of the surrounding area depending on the visual performance predicted on the basis of the user information. As a result, a user may not feel visually uncomfortable even if the image quality of the surrounding area is lowered.

The information processing apparatus may further include a gaze information obtaining unit configured to obtain gaze information on a user, and a point-of-gaze calculating unit configured to calculate a point-of-gaze on the display on the basis of the gaze information. The high-image-quality area control unit may be configured to calculate a position of the high-image-quality area on the basis of the point-of-gaze.

According to the present embodiment, a high-quality image is inevitably displayed on the point-of-gaze irrespective of its position. As a result, a user may not feel visually uncomfortable.

At least one of resolution, frame rate, bit color, and speed of an image displayed in the surrounding area may be lower than at least one of resolution, frame rate, bit color, and speed of an image displayed in the high-image-quality area.

According to the present embodiment, since a plurality of algorithms are used to lower the image quality, the entire rendering processing amount is further reduced.

The information processing apparatus may further include a rendering unit configured to render a high-quality image displayed in the high-image-quality area, and render a low-quality image displayed in the surrounding area.

The rendering unit may be configured to change at least one of resolution, frame rate, bit color, and speed depending on a kind of a rendered image to thereby render a low-quality image displayed in the surrounding area.

According to the present embodiment, since a plurality of algorithms are used to lower the image quality depending on a kind of a rendered image, the entire rendering processing amount is further reduced, and at the same time, a user may not feel visually uncomfortable.

The high-image-quality area control unit may be configured to calculate a position of a first high-image-quality area on the basis of the point-of-gaze, calculate a position of a second high-image-quality area on the basis of a center point of the display, calculate a size of at least the first high-image-quality area on the basis of the user information, and calculate, as the high-image-quality area, an area at least including the first high-image-quality area and the second high-image-quality area.

According to the present embodiment, the high-quality image is inevitably displayed on the center point of the display. Therefore when a user gazes a position different from the center point and his point-of-gaze then returns to the center point, a user may not feel visually uncomfortable even immediately after that.

The high-image-quality area control unit may be configured to calculate a position of a first high-image-quality area on the basis of the point-of-gaze, calculate a position of a second high-image-quality area on the basis of a previous point-of-gaze, calculate a size of at least the first high-image-quality area on the basis of the user information, and calculate, as the high-image-quality area, an area at least including the first high-image-quality area and the second high-image-quality area.

According to the present embodiment, the high-quality image is displayed on the previous point-of-gaze. Therefore when a user gazes a position different from the previous point-of-gaze and his point-of-gaze then returns to the previous point-of-gaze, a user may not feel visually uncomfortable even immediately after that.

According to an embodiment of the present technology, an information processing method includes: obtaining detected user information on a user, the user information excluding gaze information; and determining a high-image-quality area on the basis of the user information, a quality of an image displayed in the high-image-quality area being higher than a quality of an image displayed in an area other than the high-image-quality area in an entire area of a display viewed by the user.

According to an embodiment of the present technology, a program causes a computer to operate as a user information obtaining unit and a high-image-quality area control unit. The user information obtaining unit is configured to obtain detected user information on a user, the user information excluding gaze information. The high-image-quality area control unit is configured to determine a high-image-quality area on the basis of the user information, a quality of an image displayed in the high-image-quality area being higher than a quality of an image displayed in an area other than the high-image-quality area in an entire area of a display viewed by the user.

Advantageous Effects of Invention

As described above, according to the present technology, a user-friendly information processing apparatus, an information processing method, and a program will be provided.

Note that the effects described here are not the limitation, and any of the effects described in the present disclosure may be obtained.

MODE(S) FOR CARRYING OUT THE INVENTION

Hereinafter, embodiments of the present technology will be described with reference to the drawings.

1. First Embodiment (1-1. Outline of Information Processing Apparatus)

Figure 1:
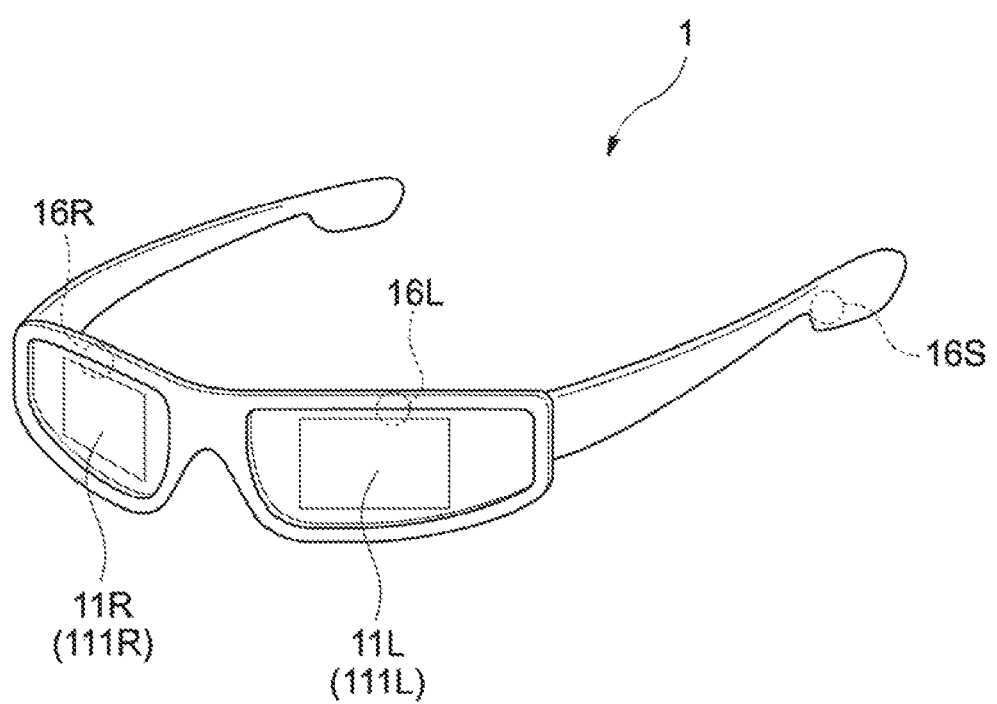
FIG. 1 A perspective view showing at least part of an information processing apparatus of a first embodiment.

FIG. 1 is a perspective view showing at least part of an information processing apparatus of a first embodiment.

The information processing apparatus 1 is, for example, a see-through HMD (Head Mount Display). The information processing apparatus 1 includes the left-eye image output unit 11L and the right-eye image output unit 11R for the right-and-left eyes of a person. The information processing apparatus 1 is capable of displaying images on the displays 111L, 111R of the image output units 11L, 11R, respectively. A user, who wears the HMD (the information processing apparatus 1) as eyeglasses, is capable of viewing the environment around the user in a see-through manner and viewing the images displayed on the displays 111L, 111R of the image output units 11L, 11R, respectively, at the same time. Note that, hereinafter, the image output units 11L, 11R will sometimes be collectively referred to as the image output unit(s) 11, and the displays 111L, 111R will sometimes be collectively referred to as the display(s) 111.

(1-2. Hardware Configuration of Information Processing Apparatus)

Figure 2:
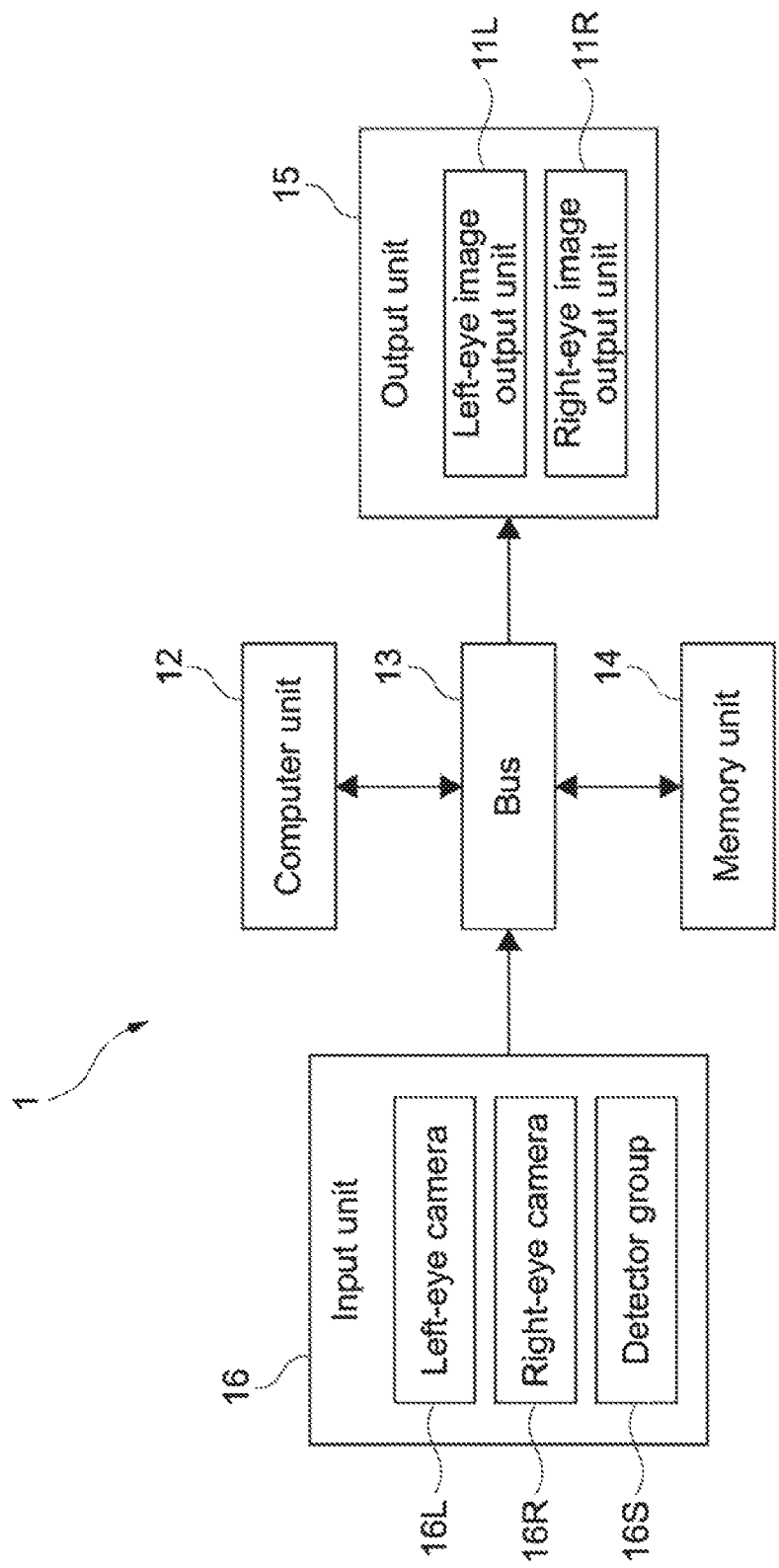
FIG. 2 A block diagram showing a hardware configuration of the information processing apparatus.

FIG. 2 is a block diagram showing a hardware configuration of the information processing apparatus.

In the information processing apparatus 1, the memory unit 14, the output unit 15, and the input unit 16 are connected to the computer unit 12 via the bus 13. Note that an electronic device/electronic devices (not shown) wiredly or wirelessly connected to the HMD may include at least part of the hardware configuration of the information processing apparatus 1.

The memory unit 14 includes a ROM (Read Only Memory), a RAM (Random Access Memory), and another semiconductor memory. The ROM fixedly stores programs that the computer unit 12 executes, data, and the like. The programs stored in the ROM are loaded in the RAM.

The computer unit 12 includes a CPU (Central Processing Unit), a GPU (Graphics Processing Unit), and the like. The computer unit 12 executes the programs loaded in the RAM.

The output unit 15 includes the image output units 11L, 11R. The image output units 11L, 11R execute computer processing on the basis of information received from the computer unit 12, and display generated image signals on the displays 111L, 111R (FIG. 1). Typically, the output unit 15 further includes a sound output unit (not shown).

The input unit 16 includes the left-eye camera 16L and the right-eye camera 16R that take pictures of right-and-left eyeballs of the user, and the detector group 16S (also shown in FIG. 1). The input unit 16 writes gaze information obtained by the cameras 16L, 16R (gaze information obtaining unit) and information detected by the detector group 16S in the memory unit 14 as logs. Note that the positions of the cameras 16L, 16R and the detector group 16S are not limited to the examples shown in FIG. 1.

The detector group 16S includes a plurality of detectors that detect biological-body information on a user, information that is used to obtain behavior information on a user, and information that is used to obtain environment information on an environment around a user.

Specific examples of the detectors that detect biological-body information on a user include a heartbeat sensor, a sweating sensor, a temperature (body temperature) sensor, a brain-wave sensor, and the like.

Specific examples of the detectors that detect information that is used to obtain behavior information on a user include an acceleration sensor, a gyro sensor, a geomagnetic sensor (9-axis sensor), and the like that detect motion and posture (run, walk, stop, etc.) of a user.

Specific examples of the detectors that detect information that is used to obtain environment information on an environment around a user include receiver devices that employ technologies such as GPS (Global Positioning System), Wi-Fi (Wireless Fidelity, registered trademark), and SLAM (Simultaneous Localization and Mapping), an environment camera that takes a picture of a field of vision of a user, a microphone that detects sounds (noise) around a user, a luminance sensor that detects brightness-and-darkness of environment light, and the like.

(1-3. Functions of Information Processing Apparatus)

Figure 3:
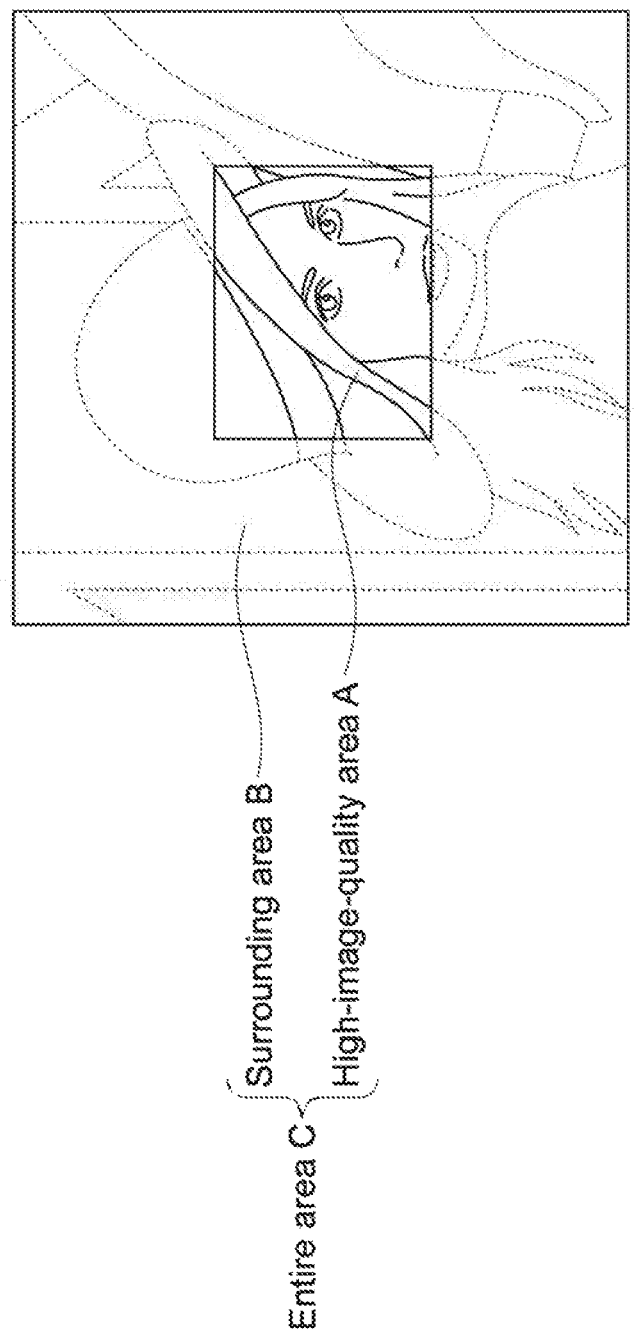
FIG. 3 A diagram for schematically illustrating functions of the information processing apparatus.

FIG. 3 is a diagram for schematically illustrating functions of the information processing apparatus.

The entire area C of the display 111 for displaying an image includes the high-image-quality area A, a quality of an image displayed in the high-image-quality area A being higher than a quality of an image displayed in the other area (the surrounding area B). Specifically, the high-image-quality area A corresponds to the central field of view of a user.

The central field of view is a very narrow range at the center part of the entire field of view of a person. The visual performance such as visual acuity and color vision is high in the central field of view. The central field of view is a field of view range in which high-precision information is acceptable. The size of the central field of view changes affected by biological stress, motional stress, and environmental stress of a person. For a specific example of effects of the biological stress, the central field of view may be narrower when a user feels nervous, e.g., has a high heart rate. For a specific example of effects of the motional stress, the central field of view may be narrower in the order of stop (or sit), walk, and run. For a specific example of effects of the environmental stress, the central field of view in a dark place may be narrower than the central field of view in a bright place. The information processing apparatus 1 predicts wideness/narrowness of a central field of view on the basis of at least one of biological-body information on a user, behavior information on a user, and environment information on an environment around a user, and dynamically changes the size of the high-image-quality area A depending on the predicted wideness/narrowness of the central field of view.

Note that, for better understanding, a line (rectangle), i.e., the boundary between the high-image-quality area A and the surrounding area B, is shown in this diagram. However, this is just a virtual rectangle, and is not displayed on the display 111 in fact. The same applies to the following diagram other than FIG. 3.

In summary, the information processing apparatus 1 includes: a user information obtaining unit 102 configured to obtain detected user information on a user, the user information excluding gaze information; and a high-image-quality area control unit 103 configured to determine a high-image-quality area on the basis of the user information, a quality of an image displayed in the high-image-quality area being higher than a quality of an image displayed in an area other than the high-image-quality area in an entire area of a display viewed by the user. The high-image-quality area control unit 103 is configured to determine a size of the high-image-quality area on the basis of the user information. The information processing apparatus 1 further includes a rendering unit 105 configured to render a high-quality image displayed in the high-image-quality area, and render a low-quality image displayed in the surrounding area, the surrounding area being an area of the entire area excluding the high-image-quality area. The information processing apparatus 1 further includes: a gaze information obtaining unit (the cameras 16L, 16R) configured to obtain gaze information on a user; and a point-of-gaze calculating unit 101 configured to calculate a point-of-gaze on the display on the basis of the gaze information, in which the high-image-quality area control unit 103 is configured to calculate a position of the high-image-quality area on the basis of the point-of-gaze.

In the present disclosure, the "gaze information" is information that is used to calculate the point-of-gaze on the display 111 viewed by the user. The "user information" is detected information on a user, the "user information" excluding the "gaze information" in the present disclosure.

The user information includes at least one of biological-body information on a user, behavior information on a user, and environment information on an environment around a user. Specific examples of the biological-body information include information on heartbeat, sweating, body temperature, brain-wave, and the like. Specific examples of the behavior information include information on motion and posture (run, walk, stop, use stairs, drive, speak, etc.) and the like. Specific examples of the environment information include information on a relatively large space (indoor, outdoor, in a train, etc.), a narrow environment around a user (number of people around user, speaking, etc.), a narrower environment, i.e., a field of vision of a user (i.e., background of a displayed image) (text, moving object, color, spatial frequency, luminance, etc.), and the like. They are just examples, and the information is not limited to those specific examples.

Hereinafter, the specific configuration and operations of the information processing apparatus 1, which includes the configuration to realize the above-mentioned functions, will be described in detail.

(1-4. Functional Configuration of Information Processing Apparatus)

Figure 4:
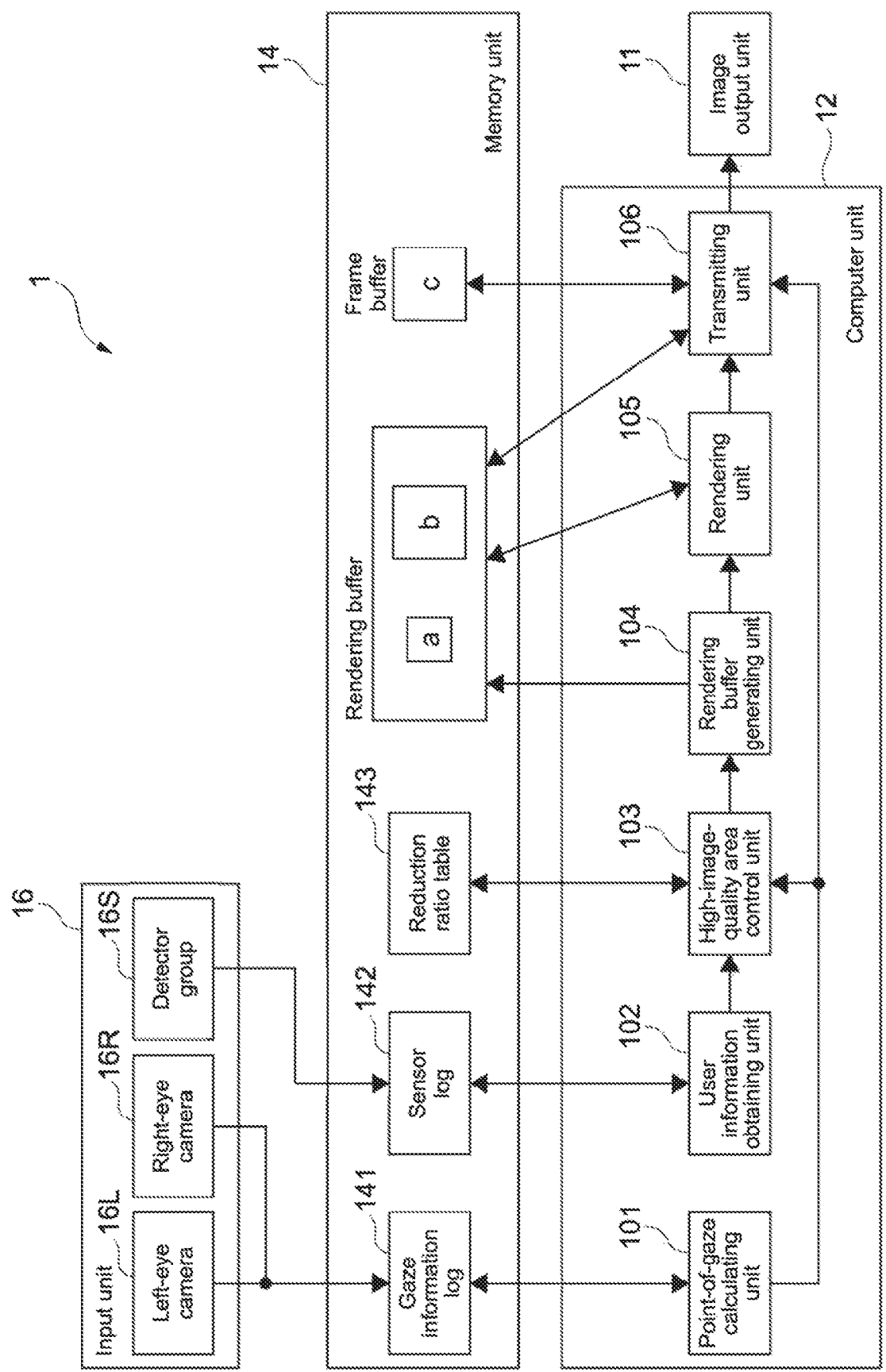
FIG. 4 A block diagram showing a functional configuration of the information processing apparatus.

FIG. 4 is a block diagram showing a functional configuration of the information processing apparatus.

The information processing apparatus 1 includes the input unit 16, the point-of-gaze calculating unit 101, the user information obtaining unit 102, the high-image-quality area control unit 103, the rendering buffer generating unit 104, the rendering unit 105, the transmitting unit 106, the memory unit 14, and the image output unit 11.

Each of the cameras 16L, 16R functions as a gaze information obtaining unit configured to obtain gaze information on a user. Specifically, the cameras 16L, 16R take pictures of the right-and-left eyeballs of a user, and writes gaze information in the gaze information log 141 of the memory unit 14. The gaze information is information on gaze directions (x, y, z) of a user).

With reference to the gaze information log 141, the point-of-gaze calculating unit 101 calculates the point-of-gaze (x, y) on the display 111 of the image output unit 11 on the basis of the gaze information (gaze directions (x, y, z) of user). The point-of-gaze calculating unit 101 supplies position information on the calculated point-of-gaze, i.e., point-of-gaze information, to the high-image-quality area control unit 103 and the transmitting unit 106.

The detector group 16S writes detected information in the sensor log 142 of the memory unit 14.

The user information obtaining unit 102 reads the information written in the sensor log 142 by the detector group 16S. The user information obtaining unit 102 uses the read information as it is as user information, and generates user information on the basis of the read information. The user information obtaining unit 102 supplies the obtained user information (biological-body information on a user, behavior information on a user, environment information on an environment around a user) to the high-image-quality area control unit 103.

The high-image-quality area control unit 103 calculates the size of the high-image-quality area A on the basis of the user information supplied from the user information obtaining unit 102. Specifically, the high-image-quality area control unit 103 reads the reduction ratio table 143 stored in the memory unit 14. In the reduction ratio table 143, different reduction ratio values are assigned to different kinds of user information that the user information obtaining unit 102 may obtain, respectively. The high-image-quality area control unit 103 reads a reduction ratio value assigned to user information (behavior information), which is supplied from the user information obtaining unit 102, from the reduction ratio table 143. The high-image-quality area control unit 103 calculates the actual size of the high-image-quality area A on the basis of the reduction ratio read from the reduction ratio table 143.

The high-image-quality area control unit 103 calculates the position of the high-image-quality area A on the basis of the point-of-gaze information supplied from the point-of-gaze calculating unit 101. Specifically, the high-image-quality area control unit 103 calculates the position of the high-image-quality area A such that the position of the point-of-gaze is the same as the center position of the high-image-quality area A.

In this manner, the high-image-quality area control unit 103 calculates the high-image-quality area A. The high-image-quality area control unit 103 notifies the rendering buffer generating unit 104 of the calculated high-image-quality area A.

The rendering buffer generating unit 104 generates the high-image-quality rendering buffer "a" and the low-image-quality rendering buffer "b". The high-image-quality rendering buffer "a" has the size the same as that of the high-image-quality area A, and has a high resolution (high image quality). The low-image-quality rendering buffer "b" has the size the same as that of the entire area C, and has a low resolution (low image quality). The rendering buffer generating unit 104 stores the generated high-image-quality rendering buffer "a" and the generated low-image-quality rendering buffer "b" in the memory unit 14. The rendering buffer generating unit 104 notifies the rendering unit 105 that the high-image-quality rendering buffer "a" and the low-image-quality rendering buffer "b" are prepared.

The rendering unit 105 reads the high-image-quality rendering buffer "a" from the memory unit 14. The rendering unit 105 writes the information on the image (referred to as partial image), which is displayed in the high-image-quality area A calculated by the high-image-quality area control unit 103, in the high-image-quality rendering buffer "a".

The rendering unit 105 reads the low-image-quality rendering buffer "b" from the memory unit 14. The rendering unit 105 writes the information on the image (referred to as entire image), which is displayed in the entire area, in the low-image-quality rendering buffer "b" at a predetermined reduction ratio. The rendering unit 105 notifies the transmitting unit 106 that the information on the partial image is written in the high-image-quality rendering buffer "a" and the information on the entire image is written in the low-image-quality rendering buffer "b".

The transmitting unit 106 writes, in the frame buffer "c" for the display 111 stored in the memory unit 14, the information on the entire image written in the low-image-quality rendering buffer "b" such that it is rendered at the enlarged size. The transmitting unit 106 writes, in the frame buffer "c", the information on the partial image rendered in the high-image-quality rendering buffer "a" such that it is rendered at the same size, at the position at which the center point of the image rendered in the high-image-quality rendering buffer "a" is the same as the point-of-gaze P1. In other words, the transmitting unit 106 writes, in the frame buffer "c" for the display 111, image information, in which the high-quality partial image displayed in the high-image-quality area A is overlaid (overlapped) on the low-quality entire image displayed in the entire area C. The transmitting unit 106 transmits the image information written in the frame buffer "c" to the image output unit 11.

On the basis of the image information supplied from the transmitting unit 106, the image output unit 11 displays the low-quality entire image in the entire area C of the display 111, and displays the high-quality partial image in the high-image-quality area A such that the partial image is overlaid (overlapped) on the entire image.

(1-5. Operations of Information Processing Apparatus)

Figure 5:
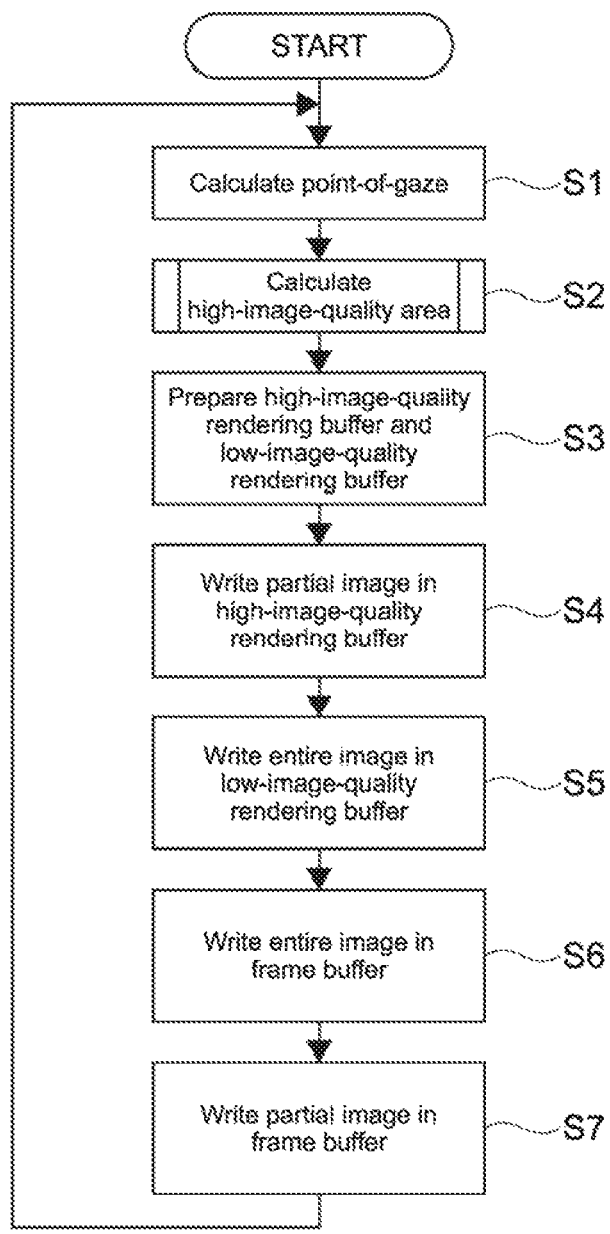
FIG. 5 A flowchart showing operations of the information processing apparatus.

FIG. 5 is a flowchart showing operations of the information processing apparatus.

With reference to FIG. 5, operations of the information processing apparatus 1 having the above-mentioned functional configuration will be described more specifically.

The cameras 16L, 16R take pictures of the right-and-left eyeballs of a user, and writes gaze information of a predetermined time period in the gaze information log 141 of the memory unit 14. The gaze information is information on the gaze directions (x, y, z) of a user.

With reference to the gaze information log 141, the point-of-gaze calculating unit 101 calculates the point-of-gaze (x, y) on the display 111 of the image output unit 11 on the basis of the gaze information (gaze directions (x, y, z) of user) (Step S1). The point-of-gaze calculating unit 101 supplies position information on the calculated point-of-gaze, i.e., point-of-gaze information, to the high-image-quality area control unit 103 and the transmitting unit 106.

The high-image-quality area control unit 103 calculates the high-image-quality area A (Step S2). The processing of a method of calculating the high-image-quality area A will be described specifically in the following.

Figures 6, 7:
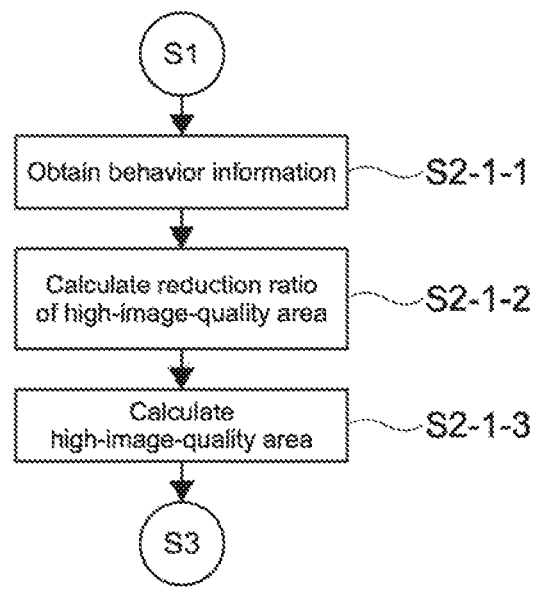
FIG. 6 A flowchart showing a method of calculating the high-image-quality area.
FIG. 7 A diagram showing a reduction ratio table.

FIG. 6 is a flowchart showing a method of calculating the high-image-quality area.

In the following flowcharts, each step number may be referred to as, for example, "S2-1-1". The numbers after "S" mean "(step number of main routine of FIG. 5)-(embodiment number)-(step number of subroutine)".

The detector group 16S writes detected information in the sensor log 142 of the memory unit 14. Specific examples of the detected information include biological-body information on a user (heartbeat, sweating, body temperature, brain-wave, etc.), data of an acceleration sensor, a gyro sensor, a geomagnetic sensor (9-axis sensor), and the like, GPS information, Wi-Fi information, SLAM information, information on a picture taken by an environment camera, and microphone sound (noise) information.

The user information obtaining unit 102 reads the information written in the sensor log 142 by the detector group 16S. The user information obtaining unit 102 uses the read information as it is as user information, and generates user information on the basis of the read information. For example, the user information obtaining unit 102 uses the read biological-body information on a user (heartbeat, sweating, body temperature, brain-wave, etc.) as it is. Alternatively, for example, the user information obtaining unit 102 determines the behavior (motion, posture (run, walk, stop, etc.)) of a user on the basis of the read data of an acceleration sensor, a gyro sensor, a geomagnetic sensor (9-axis sensor), and the like to thereby obtain behavior information on a user. Alternatively, for example, the user information obtaining unit 102 determines environment information on an environment around a user on the basis of the read GPS information, Wi-Fi information, SLAM information, information on a picture taken by an environment camera, and microphone sound (noise) information, and luminance information on environment light to thereby obtain environment information on an environment around a use. The user information obtaining unit 102 supplies the obtained user information (biological-body information on a user, behavior information on a user, environment information on an environment around a user) to the high-image-quality area control unit 103.

In the present embodiment described below, it is assumed that, specifically, the user information obtaining unit 102 determines the behavior (run, walk, stop) of a user on the basis of information on at least an acceleration sensor to thereby obtain behavior information on a user. For example, the user information obtaining unit 102 determines that a user stops (or is sitting) where the motion speed of the user is 0 cm/second or more and less than 5 cm/second, determines that a user is walking where the motion speed of the user is 5 cm/second or more and less than 20 cm/second, and determines that a user is running where the motion speed of the user is 20 cm/second or more. The user information obtaining unit 102 supplies the obtained behavior information on a user (run, walk, stop) to the high-image-quality area control unit 103 (Step S2-1-1).

The high-image-quality area control unit 103 calculates the size of the high-image-quality area A on the basis of the user information (behavior information) supplied from the user information obtaining unit 102. A method thereof will be described specifically.

Firstly, the high-image-quality area control unit 103 reads the reduction ratio table 143 stored in the memory unit 14. In the reduction ratio table 143, different reduction ratio values are assigned to different kinds of behavior (run, walk, stop) of a user determined by the user information obtaining unit 102, respectively. The "reduction ratio" is a factor used to calculate the size of the high-image-quality area A. In other words, the default value (maximum value) of the size of the high-image-quality area A is predetermined. The actual size of the high-image-quality area A is obtained by multiplying the default value by the reduction ratio.

FIG. 7 is a diagram showing a reduction ratio table.

Where the user information (behavior information) supplied from the user information obtaining unit 102 is "stop", the high-image-quality area control unit 103 reads the reduction ratio "1", which is assigned to "stop", from the reduction ratio table 143. Similarly, the high-image-quality area control unit 103 reads the reduction ratio "1/2" for "walk", and reads the reduction ratio "1/3" for "run" (Step S2-1-2). Note that those reduction ratio values are just examples.

With reference to FIG. 6 again, the high-image-quality area control unit 103 multiplies the default value of the size of the high-image-quality area A by the reduction ratio read from the reduction ratio table 143 to thereby calculate the actual size of the high-image-quality area A. Further, the high-image-quality area control unit 103 calculates the position of the high-image-quality area A on the basis of the point-of-gaze information supplied from the point-of-gaze calculating unit 101. Specifically, the high-image-quality area control unit 103 calculates the position of the high-image-quality area A such that the position of the point-of-gaze is the same as the center position of the high-image-quality area A. In this manner, the high-image-quality area control unit 103 calculates the high-image-quality area A (Step S2-1-3). The high-image-quality area control unit 103 notifies the rendering buffer generating unit 104 of the calculated high-image-quality area A.

With reference to FIG. 5 again, the rendering buffer generating unit 104 generates the high-image-quality rendering buffer "a" and the low-image-quality rendering buffer "b". The high-image-quality rendering buffer "a" has the size the same as that of the high-image-quality area A, and has a high resolution (high image quality). The low-image-quality rendering buffer "b" has the size the same as that of the entire area C, and has a low resolution (low image quality). For example, the reduction ratio of 1/2 of the size of the entire area C is set for the resolution of the low-image-quality rendering buffer "b". Alternatively, another value, e.g., 1/4, may be employed. The rendering buffer generating unit 104 stores the generated high-image-quality rendering buffer "a" and the generated low-image-quality rendering buffer "b" in the memory unit 14 (Step S3). The rendering buffer generating unit 104 notifies the rendering unit 105 that the high-image-quality rendering buffer "a" and the low-image-quality rendering buffer "b" are prepared.

Figure 8:
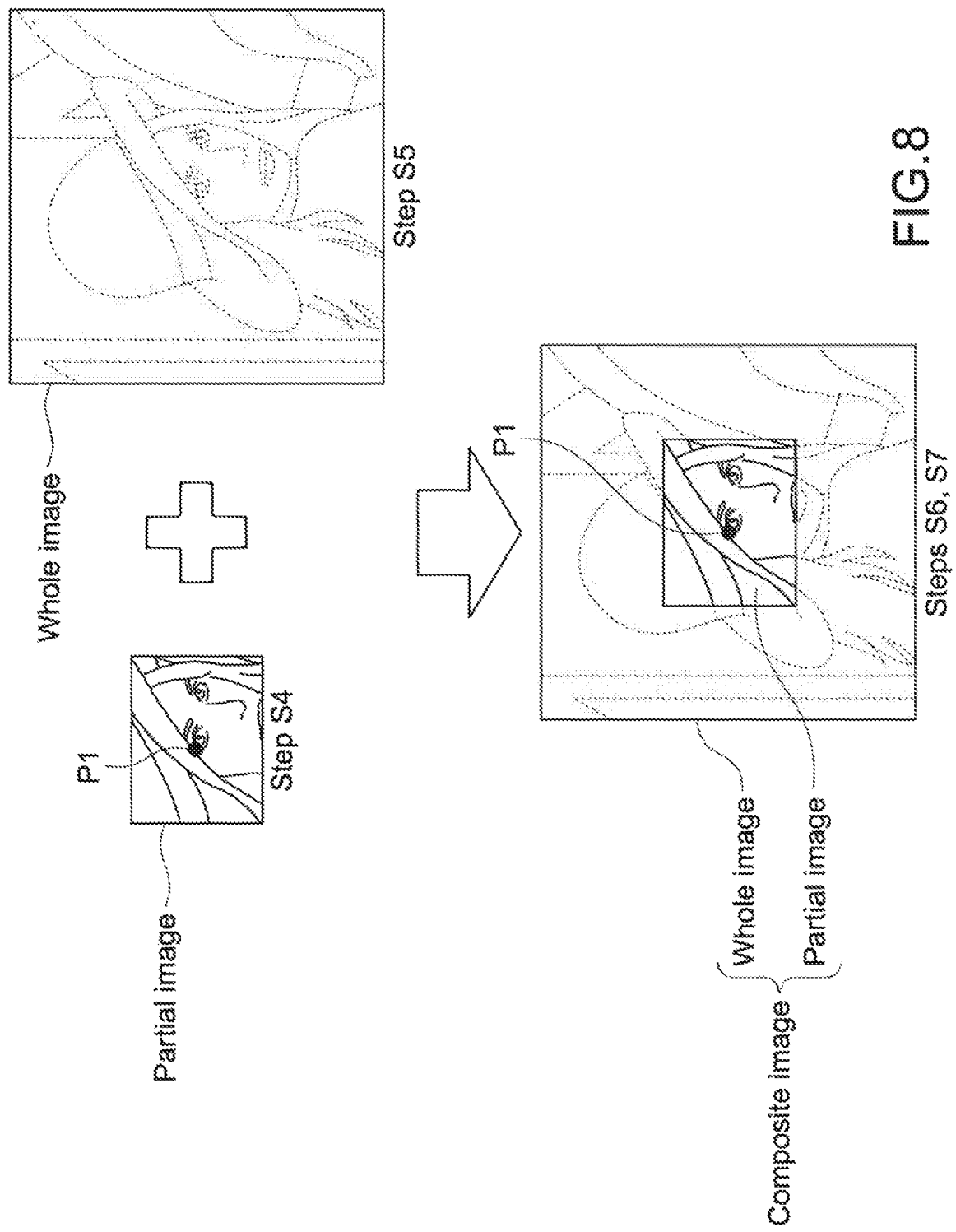
FIG. 8 A diagram for schematically illustrating operations of the information processing apparatus.

FIG. 8 is a diagram for schematically illustrating operations of the information processing apparatus with regard to the following steps.

With reference to FIG. 5 and FIG. 8, upon receiving the notification, the rendering unit 105 reads the high-image-quality rendering buffer "a" from the memory unit 14. The rendering unit 105 writes the information on the image (referred to as partial image), which is displayed in the high-image-quality area A calculated by the high-image-quality area control unit 103, in the high-image-quality rendering buffer "a" (Step S4). Note that the position of the high-image-quality area A is calculated by the high-image-quality area control unit 103 in Step S2-1-3, the point-of-gaze (P1 of FIG. 8) being the same as the center position of the high-image-quality area A.

The rendering unit 105 reads the low-image-quality rendering buffer "b" from the memory unit 14. The rendering unit 105 writes the information on the image (referred to as entire image), which is displayed in the entire area, in the low-image-quality rendering buffer "b" at the above-mentioned reduction ratio 1/2 (Step S5). The rendering unit 105 notifies the transmitting unit 106 that the information on the partial image is written in the high-image-quality rendering buffer "a" and the information on the entire image is written in the low-image-quality rendering buffer "b".

Upon receiving the above-mentioned notification, the transmitting unit 106 writes, in the frame buffer "c" for the display 111 stored in the memory unit 14, the information on the entire image written in the low-image-quality rendering buffer "b" such that it is rendered at the enlarged size (Step S6). The transmitting unit 106 writes, in the frame buffer "c", the information on the partial image rendered in the high-image-quality rendering buffer "a" such that it is rendered at the same size, at the position at which the center point of the partial image rendered in the high-image-quality rendering buffer "a" is the same as the point-of-gaze P1 (Step S7). In other words, the transmitting unit 106 writes, in the frame buffer "c" for the display 111, image (referred to as composite image) information, in which the high-quality partial image displayed in the high-image-quality area A is overlaid (overlapped) on the low-quality entire image displayed in the entire area C. The transmitting unit 106 transmits the composite-image information written in the frame buffer "c" to the image output unit 11.

On the basis of the composite-image information supplied from the transmitting unit 106, the image output unit 11 displays the low-quality entire image in the entire area C of the display 111, and displays the high-quality partial image in the high-image-quality area A such that the partial image is overlaid (overlapped) on the entire image. As a result, as shown in FIG. 3, the high-quality partial image is displayed in the high-image-quality area A of the display 111, and the low-quality image (=entire image−partial image) other than the partial image is displayed in the surrounding area B.

(1-6. Conclusion)

Since a person wears on his body or holds a wearable device such as an HMD or another mobile device, the battery capacity has a limit and, as a result, its lifetime also has a limit. However, according to the present embodiment, the display has the high-image-quality area, i.e., only part of the entire area, and the low-image-quality surrounding area. Therefore the rendering quality of the central field of view that a user can recognize very precisely is not decreased, and at the same time, the rendering processing amount (rendering cost) is reduced. As a result, even the lifetime of a device, whose battery capacity has a limit, is made longer.

According to the present embodiment, the high-image-quality area corresponds to the central field of view of a user. The size of the central field of view of a person changes affected by biological stress, motional stress, and environmental stress of the person. According to the present embodiment, the information processing apparatus predicts wideness/narrowness of a central field of view on the basis of at least one of biological-body information on a user, behavior information on a user, and environment information on an environment around a user, and dynamically changes the size of the high-image-quality area depending on the predicted wideness/narrowness of the central field of view. In other words, the information processing apparatus is capable of predicting wideness/narrowness of the central field of view in real time and dynamically changing the size of the high-image-quality area in real time for any user and in any situation. Specifically, the size of the high-image-quality area has the maximum value (default value) where it is predicted that the central field of view of a user is relatively wide, and the size of the high-image-quality area is reduced where it is predicted that the central field of view of a user is relatively narrow.

As a result, firstly, since the size of the high-image-quality area is reduced where it is predicted that the central field of view is relatively narrow, the entire rendering processing amount is further reduced. As a result, the lifetime is further made longer.

Secondly, since the size of the high-image-quality area is reduced depending on the predicted wideness/narrowness of the central field of view, a user may not feel visually uncomfortable even if the size of the high-image-quality area is reduced.

Therefore a user-friendly information processing apparatus is realized while the rendering processing amount is reduced and the lifetime is made longer.

According to the present embodiment, only one kind of parameter, i.e., behavior of a user (motion, posture (run, walk, stop, etc.)), is employed to change the size of the high-image-quality area. Alternatively a plurality of kinds parameter may be employed. By employing a plurality of kinds of parameter, it is possible to change the size of the high-image-quality area dynamically depending on the needs of individual users in more detail.

2. Second Embodiment

In the following, description on the configuration, operation, behavior, and the like similar to those of the aforementioned embodiments will be omitted, and different points will mainly be described. Further, reference signs and step numbers, which are similar to the reference signs and step numbers of the configuration and operations of the aforementioned embodiments, will be used to denote the similar configuration and operations.

(2-1. Function of Information Processing Apparatus)

According to a second embodiment, the image quality (resolution) of the area (surrounding area) other than the high-image-quality area, which corresponds to the central field of view of a user, is dynamically changed. The field of view of a person includes, around the central field of view, the useful field of view, the near peripheral field of view, the mid peripheral field of view, and the far peripheral field of view, flared concentrically and outwardly in this order. The visual performance such as visual acuity and color vision of each field of view is decreased outwardly. As described above, the size of the central field of view of a person changes affected by biological stress, motional stress, and environmental stress of the person. At the same time, the size of each field of view around the central field of view also changes affected by biological stress, motional stress, and environmental stress. For example, the central field of view, the useful field of view, and the like when a user is running (high motional stress) may be smaller than those when the user stops (low motional stress). In contrast, the far peripheral field of view and the like when a user is running (high motional stress) may be larger than those when the user stops (low motional stress) accordingly. Where the useful field of view and the like are small and the far peripheral field of view and the like are large accordingly, the entire visual performance of the field of view outside the central field of view is decreased.

According to the present embodiment, an information processing apparatus predicts high/low of the visual performance in the field of view outside the central field of view on the basis of at least one of biological-body information on a user, behavior information on a user, and environment information on an environment around a user. Then, the information processing apparatus dynamically changes the image quality of the surrounding area depending on high/low of the predicted visual performance in the field of view outside the central field of view.

In summary, the information processing apparatus further includes an image-quality control unit (the entire area image-quality control unit 107) configured to determine an image quality of a surrounding area on the basis of the user information, the surrounding area being an area of the entire area excluding the high-image-quality area.

(2-2. Functional Configuration of Information Processing Apparatus)

Figure 9:
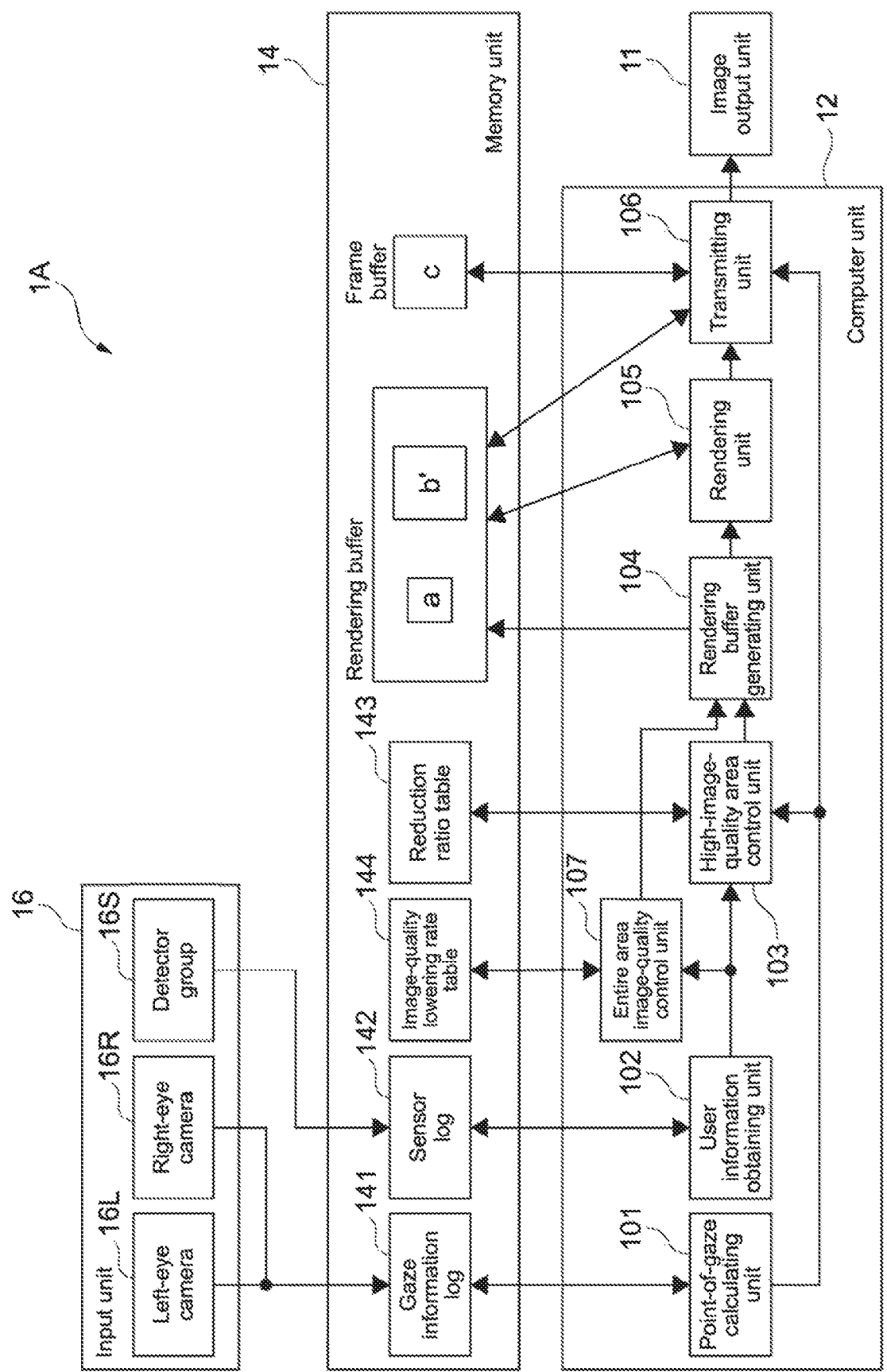
FIG. 9 A block diagram showing a functional configuration of an information processing apparatus of a second embodiment.

FIG. 9 is a block diagram showing a functional configuration of an information processing apparatus of a second embodiment.

The information processing apparatus 1A includes the functional configuration of the information processing apparatus 1 of the first embodiment and, in addition, the entire area image-quality control unit 107.

The entire area image-quality control unit 107 determines the image quality (resolution) of the entire area C on the basis of user information supplied from the user information obtaining unit 102. Specifically, the entire area image-quality control unit 107 reads the image-quality lowering rate table 144 stored in the memory unit 14. In the image-quality lowering rate table 144, different image-quality lowering rate values are assigned to different kinds of user information that the user information obtaining unit 102 may obtain, respectively. The entire area image-quality control unit 107 reads an image-quality lowering rate value assigned to user information (behavior information), which is supplied from the user information obtaining unit 102, from the image-quality lowering rate table 144. The entire area image-quality control unit 107 calculates the actual image quality (resolution) of the entire area C on the basis of the image-quality lowering rate read from the image-quality lowering rate table 144. The entire area image-quality control unit 107 notifies the rendering buffer generating unit 104 of the calculated image quality (resolution) of the entire area C.

(2-3. Operations of Information Processing Apparatus)

Figure 10:
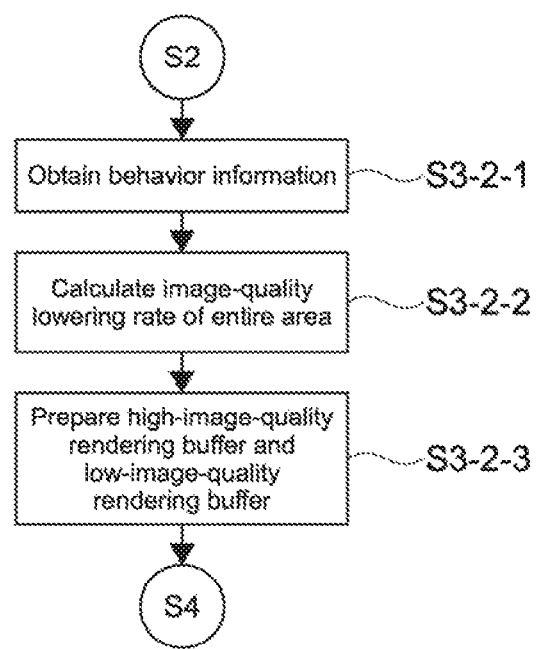
FIG. 10 A flowchart showing operations of the information processing apparatus.

FIG. 10 is a flowchart showing operations of the information processing apparatus.

The operations of the information processing apparatus 1A of the second embodiment are similar to the operations of the first embodiment except for the operation of Step S3.

The user information obtaining unit 102 supplies the obtained behavior information on a user (run, walk, stop) to the high-image-quality area control unit 103 and, in addition, the entire area image-quality control unit 107 (Step S3-2-1).

The entire area image-quality control unit 107 determines the image quality (resolution) of the entire area C on the basis of the user information (behavior information) supplied from the user information obtaining unit 102. Specifically, the entire area image-quality control unit 107 reads the image-quality lowering rate table 144 stored in the memory unit 14. In the image-quality lowering rate table 144, different image-quality lowering rate values are assigned to different kinds of behavior (run, walk, stop) of a user determined by the user information obtaining unit 102, respectively. The "image-quality lowering rate" is a factor used to calculate the image quality (resolution) of the entire area C. In other words, the default value (maximum value) of the image quality (resolution) of the entire area C is predetermined. The actual image quality (resolution) of the entire area C is obtained by multiplying the default value by the image-quality lowering rate. Note that the default value of the image quality (resolution) of the entire area C is lower than the image quality (resolution) of the high-image-quality area A.

For example, values similar to the values of the reduction ratio table 143 (FIG. 7) are recorded in the image-quality lowering rate table 144. In this case, where the user information (behavior information) supplied from the user information obtaining unit 102 is "stop", the entire area image-quality control unit 107 reads the reduction ratio "1", which is assigned to "stop", from the image-quality lowering rate table 144 (same as FIG. 7). Similarly, the entire area image-quality control unit 107 reads the image-quality lowering rate "1/2" for "walk", and reads the image-quality lowering rate "1/3" for "run" (Step S3-2-2). Note that those image-quality lowering rate values are just examples. The entire area image-quality control unit 107 notifies the rendering buffer generating unit 104 of the calculated image quality (resolution) of the entire area C.

The rendering buffer generating unit 104 generates the high-image-quality rendering buffer "a" and the low-image-quality rendering buffer "b'". The resolution of the low-image-quality rendering buffer "b'" is the resolution calculated by the entire area image-quality control unit 107. The rendering buffer generating unit 104 stores the generated high-image-quality rendering buffer "a" and the generated low-image-quality rendering buffer "b'" in the memory unit 14 (Step S3-2-3).

(2-4. Conclusion)

According to the present embodiment, the information processing apparatus predicts high/low of the visual performance in the field of view outside the central field of view on the basis of at least one of biological-body information on a user, behavior information on a user, and environment information on an environment around a user. Then, the information processing apparatus dynamically changes the image quality of the entire area depending on high/low of the predicted visual performance in the field of view outside the central field of view to thereby dynamically change the image quality of the surrounding area. In other words, the information processing apparatus is capable of predicting high/low of the visual performance in the field of view outside the central field of view in real time and dynamically changing the image quality of the entire area to thereby change the image quality of the surrounding area in real time for any user and in any situation. Specifically, the image quality of the entire area has the maximum value (default value) where it is predicted that the visual performance in the field of view outside the central field of view of a user is relatively high, and the image quality of the entire area is lowered where it is predicted that the visual performance in the field of view outside the central field of view is relatively low.

As a result, firstly, since the image quality of the entire area is lowered where it is predicted that the visual performance in the field of view outside the central field of view is relatively low, the entire rendering processing amount is further reduced. As a result, the lifetime is further made longer.

Secondly, since the image quality of the entire area is lowered depending on high/low of the predicted visual performance in the field of view outside the central field of view to thereby lower the image quality of the surrounding area, a user may not feel visually uncomfortable even if the image quality of the image quality is lowered.

Therefore a user-friendly information processing apparatus is realized while the rendering processing amount is further reduced and the lifetime is further made longer.

3. Third Embodiment (3-1. Function of Information Processing Apparatus)

According to a third embodiment, since it is predicted that the point-of-gaze of a user moves (i.e., central field of view moves), an information processing apparatus calculates a high-image-quality area on the basis of not only the current central field of view but also a predicted central field of view after moving.

In summary, the high-image-quality area control unit is configured to calculate a position of a first high-image-quality area on the basis of the point-of-gaze, calculate a position of a second high-image-quality area on the basis of a center point of the display, calculate a size of at least the first high-image-quality area on the basis of the user information, and calculate, as the high-image-quality area, an area at least including the first high-image-quality area and the second high-image-quality area.

(3-2. Operations of Information Processing Apparatus)

Figure 11:
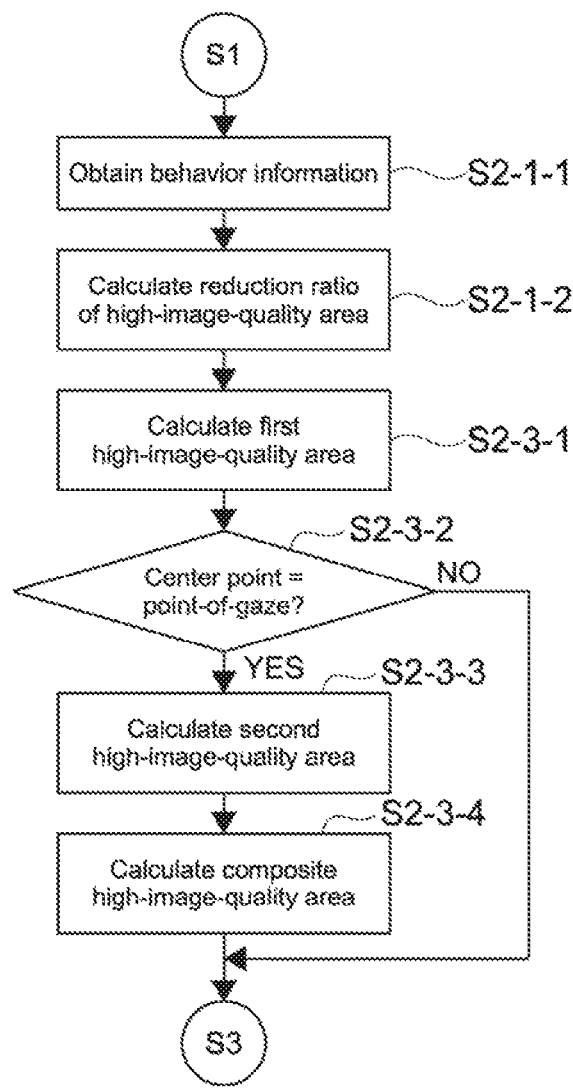
FIG. 11 A flowchart showing operations of an information processing apparatus of a third embodiment.
Figure 12:
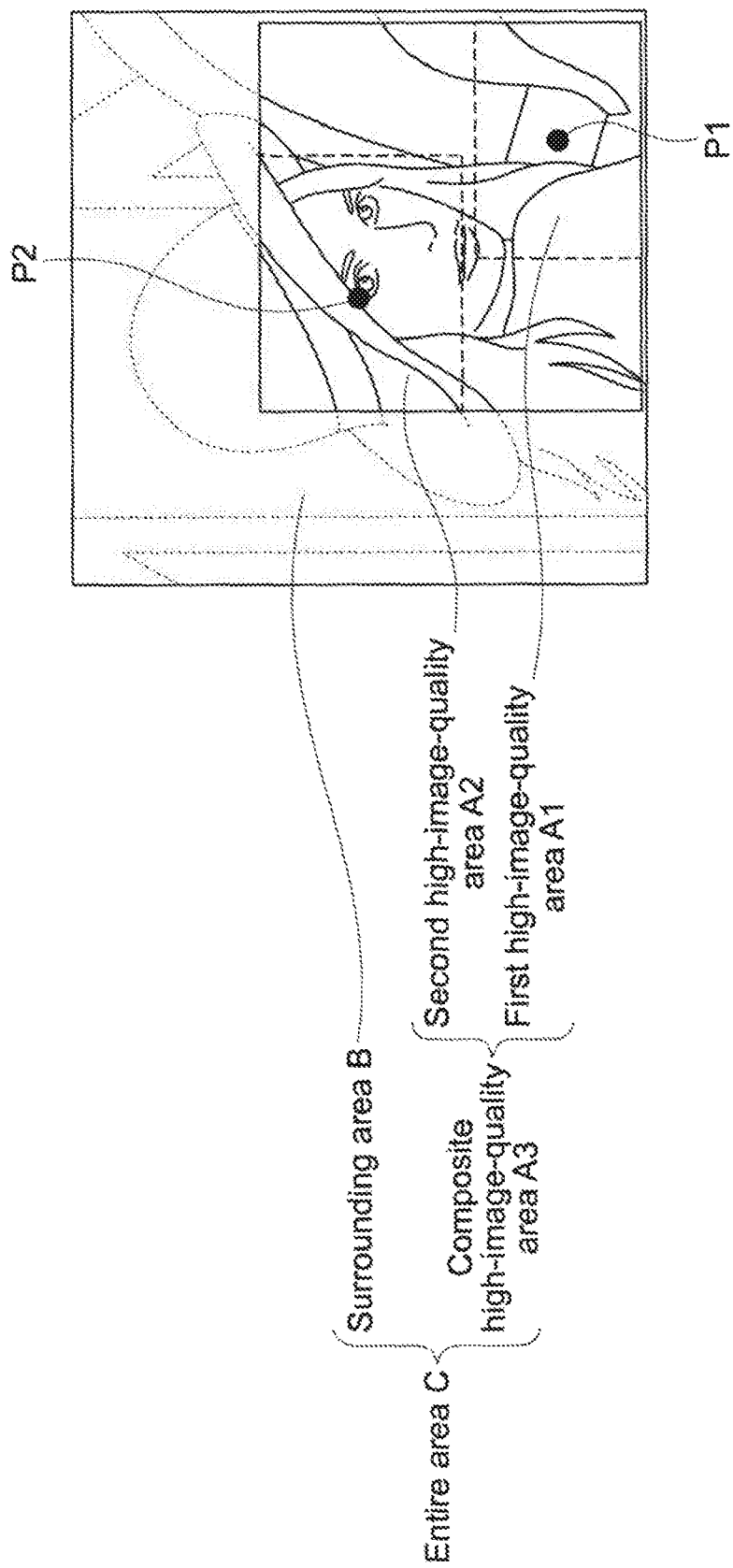
FIG. 12 A diagram for schematically illustrating functions of the information processing apparatus.

FIG. 11 is a flowchart showing operations of an information processing apparatus of a third embodiment. FIG. 12 is a diagram for schematically illustrating functions of the information processing apparatus.

The operations of the information processing apparatus of the third embodiment are similar to the operations of the first embodiment except for the operation of Step S2-1-3. The functional configuration of the information processing apparatus of the third embodiment is similar to the functional configuration of FIG. 4, and therefore is not shown.

The high-image-quality area control unit 103 multiplies the default value of the size of the first high-image-quality area A1 (corresponding to the high-image-quality area A of the first embodiment) by the reduction ratio read from the reduction ratio table 143 to thereby calculate the actual size of the first high-image-quality area A1. Further, the high-image-quality area control unit 103 calculates the position of the first high-image-quality area A1 on the basis of the point-of-gaze information supplied from the point-of-gaze calculating unit 101. Specifically, the high-image-quality area control unit 103 calculates the position of the first high-image-quality area A1 such that the position of the point-of-gaze P1 is the same as the center position of the first high-image-quality area A1. In this manner, the high-image-quality area control unit 103 calculates the first high-image-quality area A1 (Step S2-3-1).

The high-image-quality area control unit 103 determines, on the basis of the point-of-gaze information supplied from the point-of-gaze calculating unit 101, if a point-of-gaze was on the center point P2 of the entire area C in a predetermined previous time period (several seconds) or not (Step S2-3-2). If NO, the high-image-quality area control unit 103 treats the first high-image-quality area A1 as the definitive high-image-quality area A, and proceeds to Step S3.

If YES in Step S2-3-2, the high-image-quality area control unit 103 calculates the second high-image-quality area A2, the center position of the second high-image-quality area A2 being the position of the center point P2 of the entire area C (Step S2-3-3). Typically, the size of the second high-image-quality area A2 is the same as the size of the first high-image-quality area A1. The first high-image-quality area A1 may be overlapped on, adjacent to, or distant from the second high-image-quality area A2 depending the position and the size of the first high-image-quality area A1.

The high-image-quality area control unit 103 calculates the composite high-image-quality area A3 at least including the calculated first high-image-quality area A1 and the calculated second high-image-quality area A2 (Step S2-3-4). For example, it is assumed that each of the first high-image-quality area A1 and the second high-image-quality area A2 is a rectangle. In this case, the composite high-image-quality area A3 may be obtained by elongating the two sides of the first high-image-quality area A1 farther from the second high-image-quality area A2, and elongating the two sides of the second high-image-quality area A2 farther from the first high-image-quality area A1. The rectangle including the four elongated sides may be treated as the composite high-image-quality area A3.

The high-image-quality area control unit 103 notifies the rendering buffer generating unit 104 of the calculated composite high-image-quality area A3. The high-image-quality rendering buffer "a" generated by the rendering buffer generating unit 104 (Step S3) has the size the same as that of the composite high-image-quality area A3.

(3-3. Conclusion)

Especially where a user wears an eyeglasses-type see-through HMD (the information processing apparatus 1), it is predicted that the user generally gazes at the center point P2 of the entire area C of the display 111 for a long time period. Therefore, according to the present embodiment, on the presumption that the point-of-gaze will return to the center point P2 of the entire area C in a short time, the information processing apparatus calculates the high-image-quality area on the basis of not only the current point-of-gaze P1 (different from the center point P2) but also the center point P2.

As a result, firstly, since the composite high-image-quality area A3 always includes the second high-image-quality area A2 based on the center point P2, the composite high-image-quality area A3 (specifically, the second high-image-quality area A2) includes the central area, every time the point-of-gaze returns to the center point P2. Therefore a user may not feel visually uncomfortable.

Secondly, on the presumption that a user gazes at the center point P2 of the entire area C of the display 111 for a long time period, the center point of the second high-image-quality area A2 is always treated as the center point P2 of the entire area C. Therefore it is not necessary to calculate the position of the center point of the second high-image-quality area A2, and unnecessary computing may be avoided.

Thirdly, since the composite high-image-quality area A3 is calculated only when the point-of-gaze is outside the center point P2, it is not necessary to calculate the composite high-image-quality area A3 where the point-of-gaze is the same as the center point P2, and the entire rendering processing amount is reduced.

Therefore a further user-friendly information processing apparatus is realized while the rendering processing amount is reduced, the lifetime is made longer, and unnecessary computing is avoided.

4. Fourth Embodiment

A fourth embodiment is a modification example of the third embodiment.

(4-1. Operations of Information Processing Apparatus)

Figure 13:
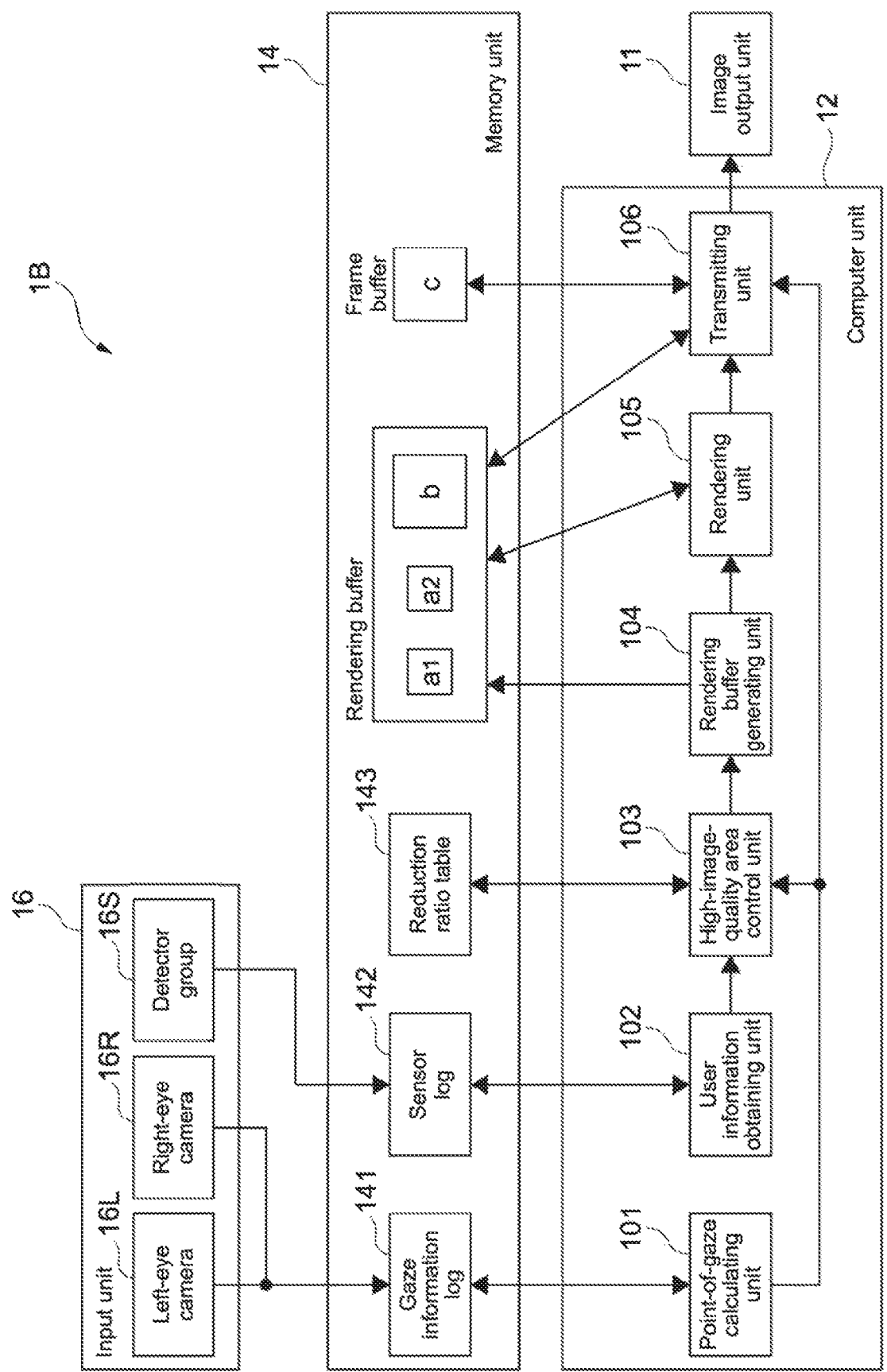
FIG. 13 A block diagram showing a functional configuration of an information processing apparatus of a fourth embodiment.
Figure 14:
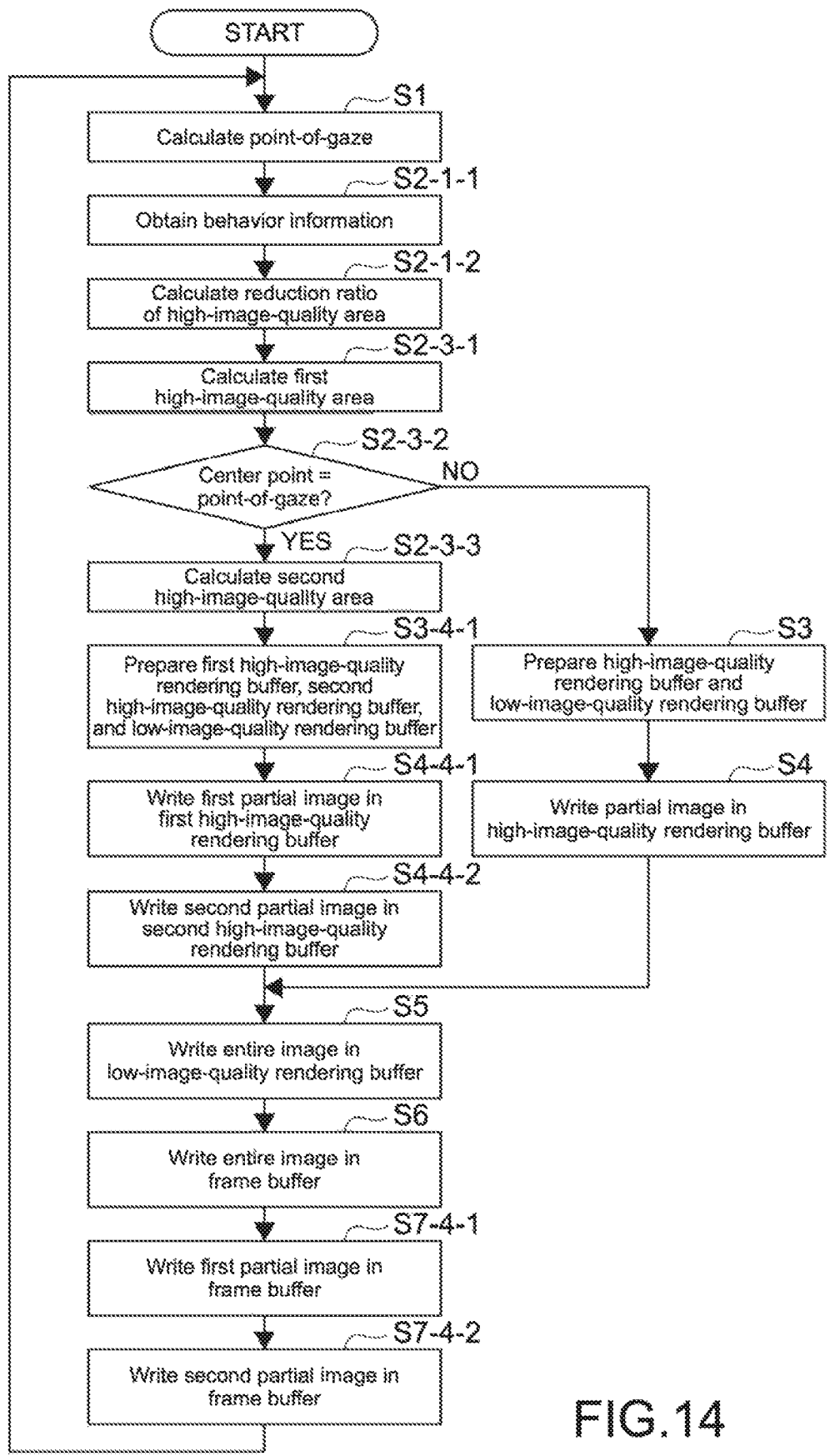
FIG. 14 A flowchart showing operations of the information processing apparatus.
Figure 15:
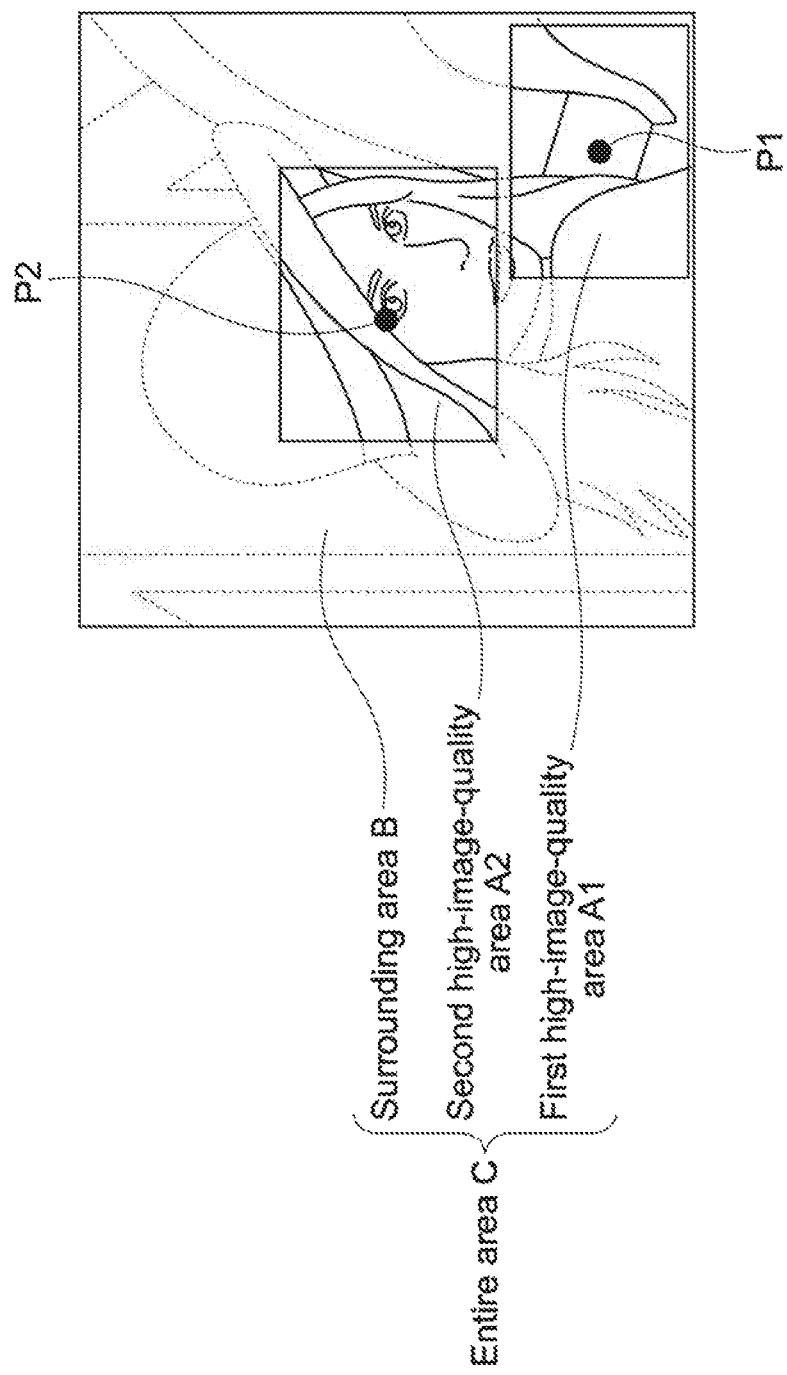
FIG. 15 A diagram for schematically illustrating functions of the information processing apparatus.

FIG. 13 is a block diagram showing a functional configuration of an information processing apparatus of a fourth embodiment. FIG. 14 is a flowchart showing operations of the information processing apparatus. FIG. 15 is a diagram for schematically illustrating functions of the information processing apparatus.

The operations of the information processing apparatus 1B of the fourth embodiment are similar to the operations of the third embodiment except for the operation of Steps S3, S4, and S7.

Firstly, the information processing apparatus executes the processing similar to that of Steps S1 to S2-3-2 of the flowchart of FIG. 11. If NO in Step S2-3-2 (the point-of-gaze was not on the center point P2 of the entire area C in a predetermined previous time period), the high-image-quality area control unit 103 treats the first high-image-quality area A1 calculated in Step S2-3-1 as the definitive high-image-quality area A, and proceeds to Step S3.

If YES in Step S2-3-2 (the point-of-gaze was on the center point P2 of the entire area C in a predetermined previous time period), the high-image-quality area control unit 103 calculates the second high-image-quality area A2, the center position of the second high-image-quality area A2 being the position of the center point P2 of the entire area C, the size of the second high-image-quality area A2 being the same as the size of the first high-image-quality area A1 (Step S2-3-3). The high-image-quality area control unit 103 notifies the rendering buffer generating unit 104 of the first high-image-quality area A1 calculated in Step S2-3-1 and the second high-image-quality area A2 calculated in Step S2-3-3. Note that the center point of the first high-image-quality area A1 is the point-of-gaze P1, and the center point of the second high-image-quality area A2 is the center point P2 of the entire area C.

Upon receiving the notification, the rendering buffer generating unit 104 generates the first high-image-quality rendering buffer "a1", the second high-image-quality rendering buffer "a2", and the low-image-quality rendering buffer "b". The first high-image-quality rendering buffer "a1" has the size the same as that of the first high-image-quality area A1, and has a high resolution (high image quality). The second high-image-quality rendering buffer "a2" has the size the same as that of the second high-image-quality area A2, and has a high resolution (high image quality). The resolution (image quality) of the first high-image-quality rendering buffer "a1" is the same as that of the second high-image-quality rendering buffer "a2". The low-image-quality rendering buffer "b" has the size the same as that of the entire area C, and has a low resolution (low image quality). The rendering buffer generating unit 104 stores the generated first high-image-quality rendering buffer "a1", the generated second high-image-quality rendering buffer "a2", and the generated low-image-quality rendering buffer "b" in the memory unit 14 (Step S3-4-1). The rendering buffer generating unit 104 notifies the rendering unit 105 that the first high-image-quality rendering buffer "a1", the second high-image-quality rendering buffer "a2", and the low-image-quality rendering buffer "b" are prepared.

Upon receiving the notification, the rendering unit 105 reads the first high-image-quality rendering buffer "a1" from the memory unit 14. The rendering unit 105 writes the information on the image (referred to as first partial image), which is displayed in the first high-image-quality area A1 calculated by the high-image-quality area control unit 103, in the first high-image-quality rendering buffer "a1" (Step S4-4-1). Further, the rendering unit 105 reads the second high-image-quality rendering buffer "a2" from the memory unit 14. The rendering unit 105 writes the information on the image (referred to as second partial image), which is displayed in the second high-image-quality area A2 calculated by the high-image-quality area control unit 103, in the second high-image-quality rendering buffer "a2" (Step S4-4-2).

The rendering unit 105 reads the low-image-quality rendering buffer "b" from the memory unit 14, and writes the information on the entire image in the low-image-quality rendering buffer "b" (Step S5). The rendering unit 105 notifies the transmitting unit 106 that the image information is written in the first high-image-quality rendering buffer "a1", the second high-image-quality rendering buffer "a2", and the low-image-quality rendering buffer "b".

Upon receiving the above-mentioned notification, the transmitting unit 106 writes, in the frame buffer "c" for the display 111 stored in the memory unit 14, the information on the entire image written in the low-image-quality rendering buffer "b" such that it is rendered at the enlarged size (Step S6).

The transmitting unit 106 writes, in the frame buffer "c", the information on the first partial image rendered in the first high-image-quality rendering buffer "a1" such that it is rendered at the same size, at the position at which the center point of the first partial image rendered in the first high-image-quality rendering buffer "a1" is the same as the point-of-gaze P1 (Step S7-4-1).

The transmitting unit 106 writes, in the frame buffer "c", the information on the second partial image rendered in the second high-image-quality rendering buffer "a2" such that it is rendered at the same size, at the position at which the center point of the second partial image rendered in the second high-image-quality rendering buffer "a2" is the same as the center point P2 of the entire area C (Step S7-4-2).

In other words, the transmitting unit 106 writes, in the frame buffer "c" for the display 111, image information, in which the high-quality first partial image displayed in the first high-image-quality area A1 and the high-quality second partial image displayed in the second high-image-quality area A2 are overlaid (overlapped) on the low-quality entire image displayed in the entire area C. The transmitting unit 106 transmits the image information written in the frame buffer "c" to the image output unit 11.

(4-2. Conclusion)

According to the present embodiment, the composite high-image-quality area A3 is not calculated, which is different from the third embodiment. Therefore the computing process may be reduced compared to that of the third embodiment. Further, the total area of the first high-image-quality area A1 and the second high-image-quality area A2, i.e., high-image-quality areas, is smaller than the composite high-image-quality area A3 of the third embodiment. As a result, the entire rendering processing amount is reduced. Therefore a further user-friendly information processing apparatus is realized while the rendering processing amount is reduced, the lifetime is made longer, and unnecessary computing is avoided.

5. Fifth Embodiment

According to the first embodiment, the resolution of the high-image-quality area A is different from that of the surrounding area B, and the image quality of the high-image-quality area A is thus different from that of the surrounding area B. To the contrary, according to a fifth embodiment, not only the resolution but also the frame rate of the high-image-quality area A are different from those of the surrounding area B, and the image quality of the high-image-quality area A is thus different from that of the surrounding area B.

Figure 16:
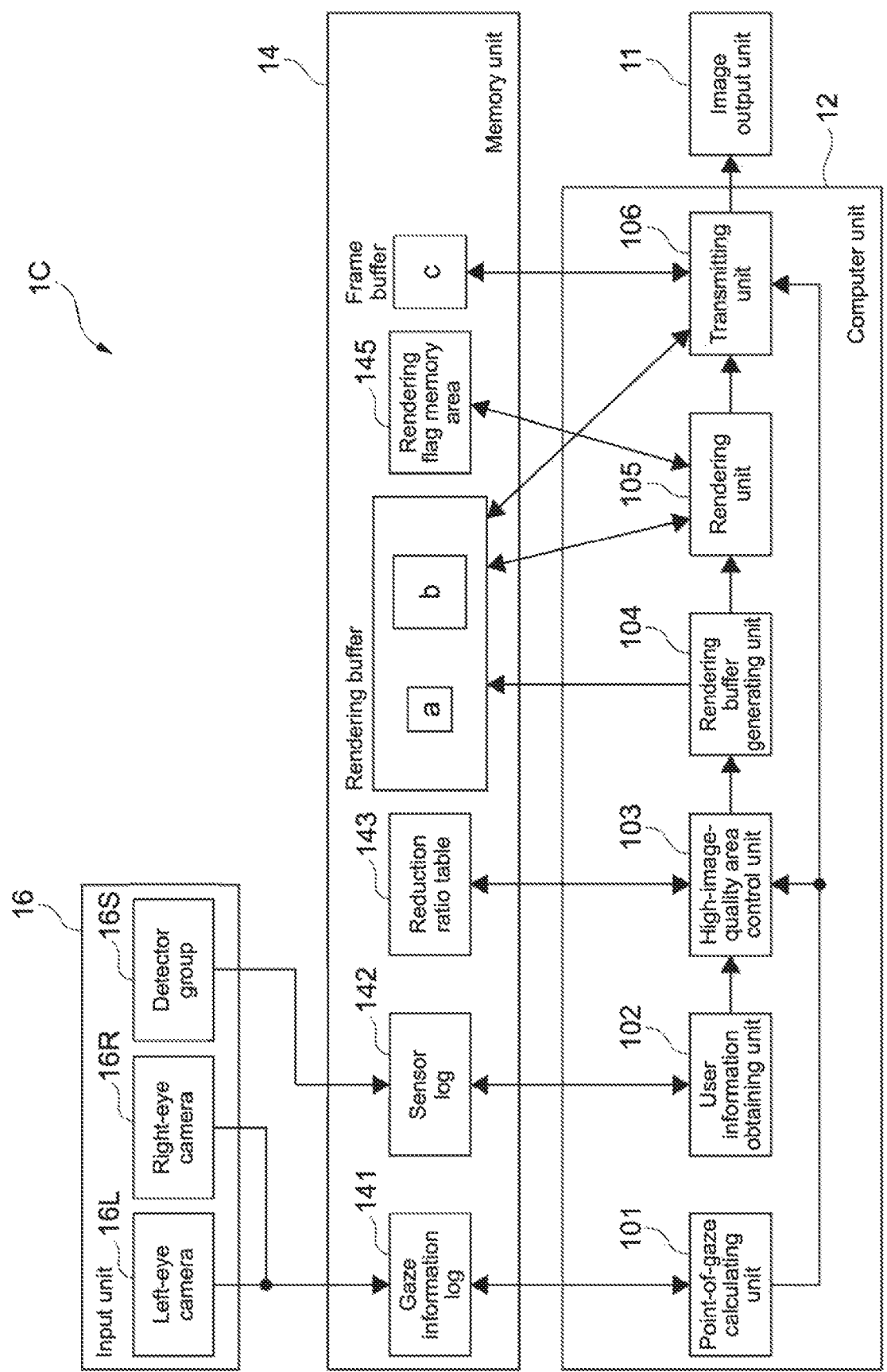
FIG. 16 A block diagram showing a functional configuration of an information processing apparatus of a fifth embodiment.

FIG. 16 is a block diagram showing a functional configuration of an information processing apparatus of a fifth embodiment.

A variable value "0" or "1", i.e., a rendering flag, is registered in the rendering flag memory area 145 of the memory unit 14 of the information processing apparatus 1C.

Figure 17:
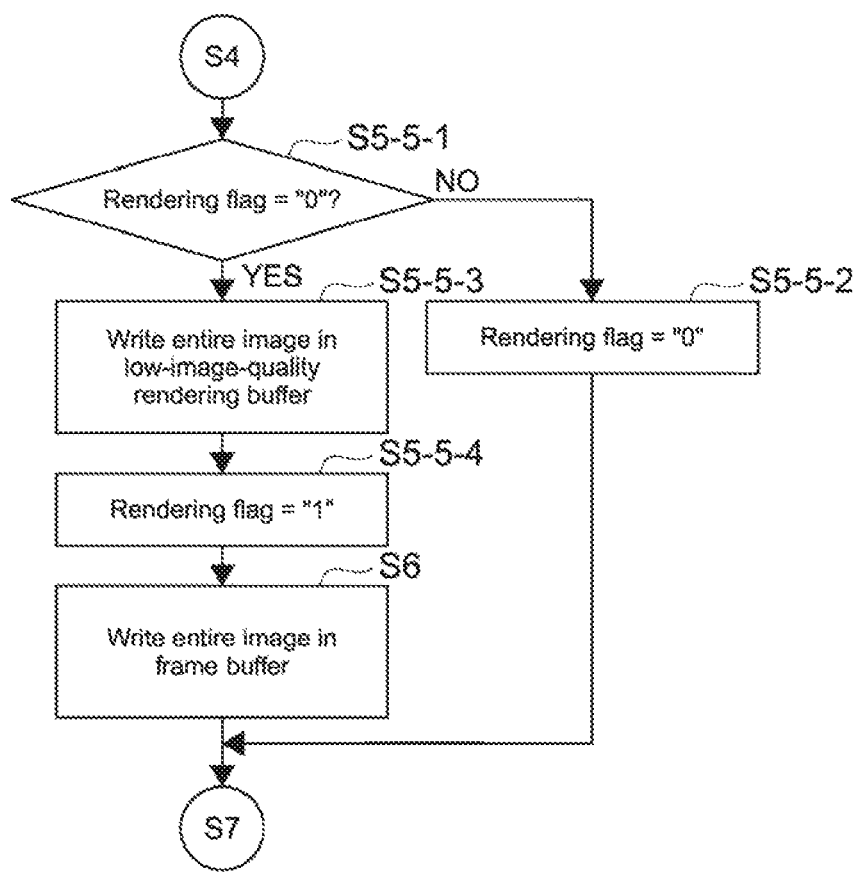
FIG. 17 A flowchart showing operations of the information processing apparatus.

FIG. 17 is a flowchart showing operations of the information processing apparatus.

The operations of the information processing apparatus of the fifth embodiment are similar to the operations of the first embodiment except for the operation of Step S5.

After writing the partial image in the high-image-quality rendering buffer "a" (Step S4), the rendering unit 105 refers to the rendering flag memory area 145 stored in the memory unit 14, and determines whether a variable value "0" is registered as the rendering flag in the rendering flag memory area 145 or not (Step S5-5-1).

Where "0" is registered in the rendering flag memory area 145 (Step S5-5-1, YES), the rendering unit 105 reads the low-image-quality rendering buffer "b" from the memory unit 14. The rendering unit 105 writes the information on the entire image in the low-image-quality rendering buffer "b" at a predetermined reduction ratio (Step S5-5-3). The rendering unit 105 notifies the transmitting unit 106 that the information on the partial image is written in the high-image-quality rendering buffer "a" and the information on the entire image is written in the low-image-quality rendering buffer "b". The rendering unit 105 registers a variable value "1" as the rendering flag in the rendering flag memory area 145 (Step S5-5-4).

Upon receiving the notification, the transmitting unit 106 writes, in the frame buffer "c", the information on the entire image written in the low-image-quality rendering buffer "b" (Step S6) and the information on the partial image rendered in the high-image-quality rendering buffer "a" (Step S7).

Meanwhile, where no variable value is registered in the rendering flag memory area 145 (Step S5-5-1, NO), the rendering unit 105 registers "0" as a default value (Step S5-5-2). Alternatively, where "1" is registered in the rendering flag memory area 145 (Step S5-5-1, NO), the rendering unit 105 registers the variable value "0" as the rendering flag (Step S5-5-2). In those cases, the rendering unit 105 notifies the transmitting unit 106 that the image information is written only in the high-image-quality rendering buffer "a".

Upon receiving the notification, the transmitting unit 106 skips Step S6, and writes, in the frame buffer "c", only the information on the partial image rendered in the high-image-quality rendering buffer "a" (Step S7). As a result, the frame rate of writing the entire image is 1/2 of the frame rate of writing the partial image. For example, where the frame rate of writing the partial image is 60 fps (frames per second), the frame rate of writing the entire image is 30 fps.

According to the present embodiment, not only the resolution but also the frame rate of the entire area C are lowered, and the image quality of the high-image-quality area A is thus different from that of the surrounding area B. Therefore the entire rendering processing amount is further reduced, and at the same time, a user may not feel visually uncomfortable. As a result, a user-friendly information processing apparatus is realized while the rendering processing amount is further reduced and the lifetime is further made longer.

6. Sixth Embodiment

According to a sixth embodiment, an algorithm of changing the image quality of the high-image-quality area A and the image quality of the entire area C is changed depending on the kinds of images (content). Specifically, where text content is displayed as an image, not only the resolution but also the frame rate of the entire area C are lowered to lower the image quality of the entire area C. Where content other than text content is displayed as an image, only the resolution of the entire area C is lowered to lower the image quality of the entire area C.

Figure 18:
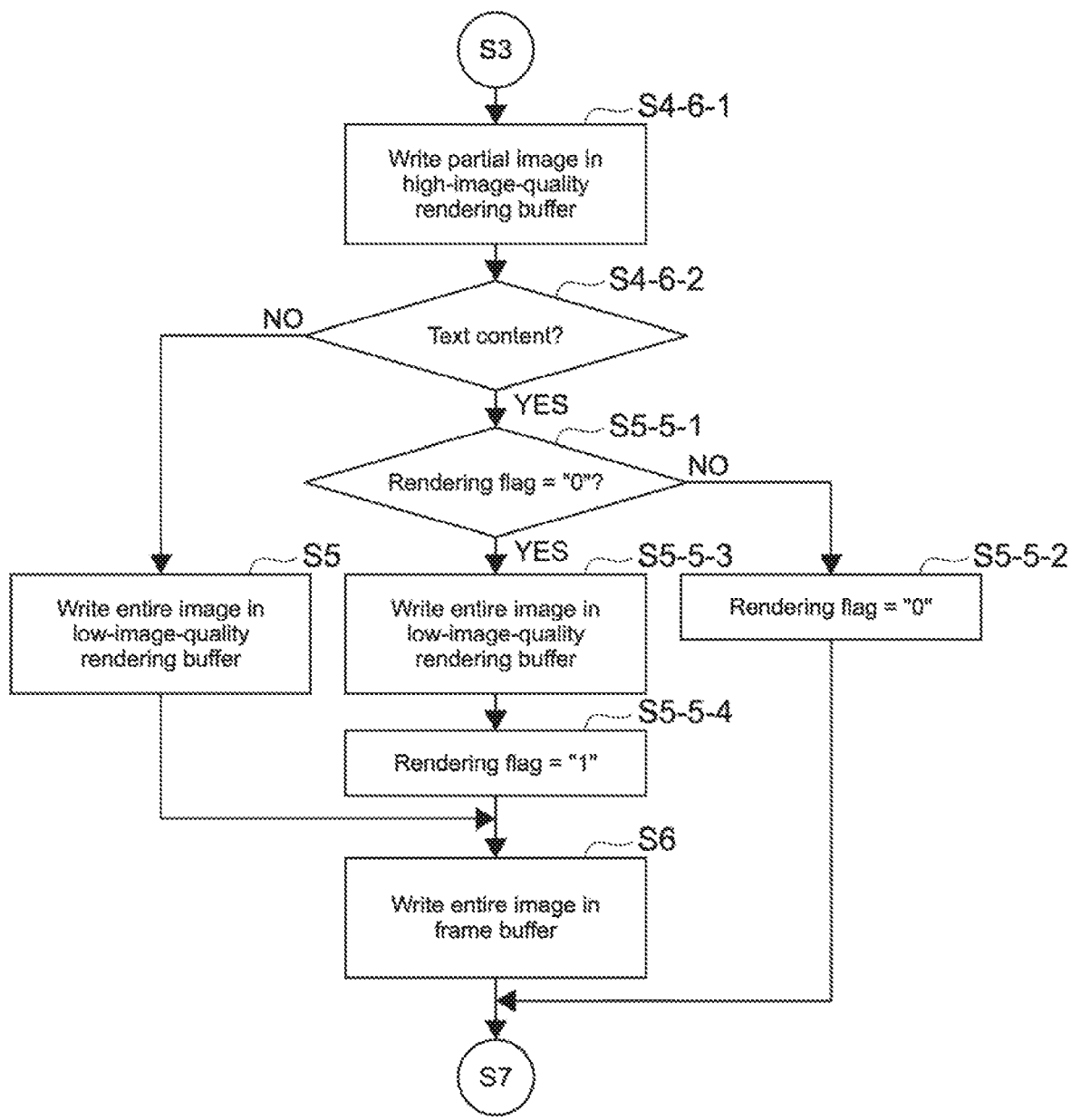
FIG. 18 A flowchart showing operations of an information processing apparatus of a sixth embodiment.

FIG. 18 is a flowchart showing operations of an information processing apparatus of a sixth embodiment.

The operations of the information processing apparatus of the sixth embodiment are similar to the operations of the first embodiment and the fifth embodiment except for the operation of Step S4. The functional configuration of the information processing apparatus of the sixth embodiment is similar to the functional configuration of FIG. 16, and therefore is not shown.

Upon receiving the notification from the rendering buffer generating unit 104 that the high-image-quality rendering buffer "a" and the low-image-quality rendering buffer "b" are prepared (Step S3), the rendering unit 105 writes the information on the partial image in the high-image-quality rendering buffer "a" (Step S4-6-1). Subsequently, the rendering unit 105 determines whether the image is text content or not (Step S4-6-2). For example, the rendering unit 105 determines whether the image is text content or not with reference to meta information described in the content itself. Where the image is not text content (Step S4-6-2, NO), the rendering unit 105 writes the information on the entire image in the low-image-quality rendering buffer "b" for every frame (Step S5). Then, the transmitting unit 106 writes, in the frame buffer "c", the information on the entire image written in the low-image-quality rendering buffer "b" (Step S6).

Meanwhile, where the image is text content (Step S4-6-2, YES), the rendering unit 105 writes the information on the entire image in the low-image-quality rendering buffer "b" at a low frame rate (for example, 1/2 of frame rate of writing partial image) (Steps S5-5-1 to S5-5-4). Further, the transmitting unit 106 writes, in the frame buffer "c", the information on the entire image written in the low-image-quality rendering buffer "b" at a low frame rate (1/2 of frame rate of writing partial image) (Step S6).

Where the image displayed in the surrounding area D is animation, and where the frame rate is lowered to lower the image quality, a user may feel visually uncomfortable. Meanwhile, where the image displayed in the surrounding area D is text, it is predicted that the image does not include animation (i.e., is a still image). Where the image is a still image, the image quality is not lowered even if the frame rate is lowered, and a user may thus hardly feel visually uncomfortable.

According to the present embodiment, where text content is displayed as an image, not only the resolution but also the frame rate of the entire area C are lowered to lower the image quality of the surrounding area B. As a result, the entire rendering processing amount is further reduced, and at the same time, a user may not feel visually uncomfortable. Therefore a user-friendly information processing apparatus is realized while the rendering processing amount is further reduced and the lifetime is further made longer.

7. Specific Examples of Parameters for Dynamically Changing Size of High-Image-Quality Area In each of the above-mentioned embodiments, the information processing apparatus predicts wideness/narrowness of a central field of view on the basis of behavior information on a user (run, walk, stop), and dynamically changes the size of the high-image-quality area depending on the predicted wideness/narrowness of the central field of view. Other specific examples of parameters for dynamically changing the size of the high-image-quality area are as follows.

For example, the user information obtaining unit 102 obtains motion information on the user's head on the basis of data of a gyro sensor and an acceleration sensor (head tracking). The high-image-quality area control unit 103 narrows the high-image-quality area, for example, when the user's head is moving actively (when user is running, etc.) since it is predicted that it is difficult for the user to visually recognize information in detail.

For another example, the user information obtaining unit 102 detects the motion speed (run, walk, stop) of a user on the basis of a GPS movement distance, a relative position of SLAM localization, a position estimated on the basis of Wi-Fi, or the like. Similar to the above-mentioned embodiments, the high-image-quality area control unit 103 narrows the high-image-quality area when the user is moving rapidly (when user is running, etc.) since it is predicted that it is difficult for the user to visually recognize information in detail.

For another example, the user information obtaining unit 102 may have a learning function, store information detected by the detector group 16S, and predict the behavior (sit, use stairs, drive, speak, etc.) of a user. For example, where it is predicted that the behavior of a user is driving, the high-image-quality area control unit 103 determines that the user himself is motionless, and widens the high-image-quality area. Where it is predicted that the behavior of a user is speaking, the high-image-quality area control unit 103 determines that the user visually pays attention to a person in front of him, and narrows the high-image-quality area.

For another example, where the heartbeat value detected by a heartbeat sensor is equal to or larger than a threshold, or where the sweating value detected by a sweating sensor is equal to or larger than a threshold, the user information obtaining unit 102 determines that the user feels nervous. The high-image-quality area control unit 103 narrows the high-image-quality area where the user feels nervous since it is predicted that it is difficult for the user to visually recognize information in detail.

For another example, the user information obtaining unit 102 recognizes an object on the basis of information on a picture taken by an environment camera that takes a picture of a field of vision of a user. Where a user gazes an object, the high-image-quality area control unit 103 controls the high-image-quality area such that it covers the object.

8. Other Embodiments

In each of the above-mentioned embodiments, the information processing apparatus is a see-through HMD, but it may be a covered HMD. Alternatively, the information processing apparatus may not be an apparatus such as an HMD, which includes displays very close to the eyes of a user. The information processing apparatus may be any electronic device configured to obtain user information (at least one of biological-body information on a user, behavior information on a user, and environment information on an environment around a user), and configured to control a display. Specific examples include various personal computers such as desktop, laptop, and tablet personal computers, a smartphone, a mobile phone, a television receiver, and the like.

Alternatively, the information processing apparatus may include, in combination, an electronic device configured to obtain user information, and an electronic device capable of communicating (typically, wirelessly communicating) with this electronic device and configured to control a display. For a specific example, the information processing apparatus may include, in combination, a wearable device (smartwatch, etc.) configured to obtain user information, and an electronic device (typically, mobile electronic device such as smartphone) capable of wirelessly communicating with this wearable device and configured to control a display.

The information processing apparatus may be an electronic device (personal computer, etc.) configured to control an external image display device (desktop monitor, projector, etc.).

Alternatively, the information processing apparatus may include, in combination, an electronic device configured to obtain user information, and a server apparatus capable of connecting with it via a network. In this case, the server apparatus receives at least part of information stored in a memory unit from the electronic device, stores the received information, executes at least part of processing (for example, high-image-quality area calculating processing, entire image and partial image rendering processing, etc.) executed by the HMD in each of the above-mentioned embodiments, and sends processed data to the electronic device.

In each of the above-mentioned embodiments, the cameras 16L, 16R take pictures of the right-and-left eyeballs of a user and obtain gaze information, and the point-of-gaze calculating unit 101 calculates a point-of-gaze (x, y) on the display 111 on the basis of the gaze information. Instead, the cameras 16L, 16R may obtain gaze information on the basis of reflected infrared. Alternatively, in place of the cameras 16L, 16R, an electromyograph (not shown) may obtain an electromyogram of a user, and obtain gaze information on the basis of the electromyogram.

According to each of the first to fourth embodiments, the resolution is changed to make the image quality of the high-image-quality area different from that of the surrounding area. According to each of the fifth and sixth embodiments, the resolution and the frame rate are changed to make the image quality of the high-image-quality area different from that of the surrounding area. Instead, the frame rate may only be changed to make the image quality of the high-image-quality area different from that of the surrounding area. Alternatively, the bit color may be changed to make the image quality of the high-image-quality area different from that of the surrounding area. For example, the high-image-quality area may be rendered in high bit color (for example, 32-bit) and the entire area may be rendered in low bit color (for example, 16-bit) to make the image quality of the high-image-quality area different from that of the surrounding area. Alternatively, the animation speed may be changed to make the image quality of the high-image-quality area different from that of the surrounding area. For example, high-speed animation may be rendered in the high-image-quality area and low-speed animation (still image, at lowest speed) may be rendered in the entire area to make the image quality of the high-image-quality area different from that of the surrounding area.

Those algorithms for changing the image quality are not alternative. At least one of the resolution, frame rate, bit color, and speed of the image displayed in the surrounding area is lower than at least one of the resolution, frame rate, bit color, and speed of the image displayed in the high-image-quality area. Further, as a modification example of the sixth embodiment, the rendering unit is configured to change at least one of the resolution, frame rate, bit color, and speed depending on the kind (text content or not) of a rendered image to thereby render a low-quality image displayed in the surrounding area.

According to each of the third and fourth embodiment, a high-quality image is rendered in the area at least including the first high-image-quality area A1, the current point-of-gaze being the center, and the second high-image-quality area A2, the position of the center point P2 of the entire area C being the center. As a modification example, a high-quality image may be rendered in an area at least including the first high-image-quality area A1, the current point-of-gaze being the center, and another high-image-quality area, the previous point-of-gaze being the center.

According to this configuration, the high-quality image is displayed on the previous point-of-gaze. Therefore when a user gazes a position different from the previous point-of-gaze and his point-of-gaze then returns to the previous point-of-gaze, a user may not feel visually uncomfortable even immediately after that.

According to the first embodiment, the center of the high-image-quality area A is treated as the point-of-gaze. Alternatively, on the presumption that a user gazes the center point of the entire area C of the display 111 for a long time, the center point of the high-image-quality area A may always be the center point of the entire area C.

According to this configuration, since it is not necessary to calculate the position (position of point-of-gaze) of the center point of the high-image-quality area A, the computing process may be reduced.

The first to sixth embodiments may be executed not only individually but also in combination.

A program, that causes an information processing apparatus to operate as the functional units of each of the embodiments and the modification examples, may be recorded in a non-transitory computer readable recording medium.

Note that the present technology may employ the following configurations.

(1) An information processing apparatus, including:
a user information obtaining unit configured to obtain detected user information on a user, the user information excluding gaze information; and
a high-image-quality area control unit configured to determine a high-image-quality area on the basis of the user information, a quality of an image displayed in the high-image-quality area being higher than a quality of an image displayed in an area other than the high-image-quality area in an entire area of a display viewed by the user.

(2) The information processing apparatus according to the above-mentioned item (1), in which
the high-image-quality area control unit is configured to determine a size of the high-image-quality area on the basis of the user information.

(3) The information processing apparatus according to the above-mentioned item (1) or (2), in which
the user information includes at least one of biological-body information on a user, behavior information on a user, and environment information on an environment around a user.

(4) The information processing apparatus according to any one of the above-mentioned items (1) to (3), further including:
an image-quality control unit configured to determine an image quality of a surrounding area on the basis of the user information, the surrounding area being an area of the entire area excluding the high-image-quality area.

(5) The information processing apparatus according to any one of the above-mentioned items (1) to (4), further including:
a gaze information obtaining unit configured to obtain gaze information on a user; and
a point-of-gaze calculating unit configured to calculate a point-of-gaze on the display on the basis of the gaze information, in which
the high-image-quality area control unit is configured to calculate a position of the high-image-quality area on the basis of the point-of-gaze.

(6) The information processing apparatus according to any one of the above-mentioned items (1) to (5), in which
at least one of resolution, frame rate, bit color, and speed of an image displayed in the surrounding area is lower than at least one of resolution, frame rate, bit color, and speed of an image displayed in the high-image-quality area.

(7) The information processing apparatus according to any one of the above-mentioned items (1) to (6), further including:
a rendering unit configured to render a high-quality image displayed in the high-image-quality area, and render a low-quality image displayed in the surrounding area.

(8) The information processing apparatus according to any one of the above-mentioned items (1) to (7), in which
the rendering unit is configured to change at least one of resolution, frame rate, bit color, and speed depending on a kind of a rendered image to thereby render a low-quality image displayed in the surrounding area.

(9) The information processing apparatus according to any one of the above-mentioned items (1) to (8), in which
the high-image-quality area control unit is configured to
calculate a position of a first high-image-quality area on the basis of the point-of-gaze,
calculate a position of a second high-image-quality area on the basis of a center point of the display,
calculate a size of at least the first high-image-quality area on the basis of the user information, and calculate, as the high-image-quality area, an area at least including the first high-image-quality area and the second high-image-quality area.

(10) The information processing apparatus according to any one of the above-mentioned items (1) to (9), in which the high-image-quality area control unit is configured to
calculate a position of a first high-image-quality area on the basis of the point-of-gaze,
calculate a position of a second high-image-quality area on the basis of a previous point-of-gaze,
calculate a size of at least the first high-image-quality area on the basis of the user information, and
calculate, as the high-image-quality area, an area at least including the first high-image-quality area and the second high-image-quality area.

(11) An information processing method, including:
obtaining detected user information on a user, the user information excluding gaze information; and
determining a high-image-quality area on the basis of the user information, a quality of an image displayed in the high-image-quality area being higher than a quality of an image displayed in an area other than the high-image-quality area in an entire area of a display viewed by the user.

(12) An image display apparatus, comprising:
a user information obtaining unit configured to obtain detected user information on a user, the user information excluding gaze information; and
a high-image-quality area control unit configured to determine a high-image-quality area on the basis of the user information, a quality of an image displayed in the high-image-quality area being higher than a quality of an image displayed in an area other than the high-image-quality area in an entire area of a display viewed by the user;
a rendering unit configured to render a high-quality image displayed in the high-image-quality area, and render a low-quality image displayed in a surrounding area, the surrounding area being an area of the entire area excluding the high-image-quality area; and
an image output unit configured to output the rendered high-quality image and the rendered low-quality image on the display.

(13) A program, that causes a computer to operate as:
a user information obtaining unit configured to obtain detected user information on a user, the user information excluding gaze information; and
a high-image-quality area control unit configured to determine a high-image-quality area on the basis of the user information, a quality of an image displayed in the high-image-quality area being higher than a quality of an image displayed in an area other than the high-image-quality area in an entire area of a display viewed by the user.

(14) A non-transitory computer readable recording medium, that records a program, that causes a computer to operate as:
a user information obtaining unit configured to obtain detected user information on a user, the user information excluding gaze information; and
a high-image-quality area control unit configured to determine a high-image-quality area on the basis of the user information, a quality of an image displayed in the high-image-quality area being higher than a quality of an image displayed in an area other than the high-image-quality area in an entire area of a display viewed by the user.

REFERENCE SIGNS LIST 1, 1A, 1B, 1C information processing apparatus
11 image output unit
12 computer
14 memory unit
16 input unit
101 point-of-gaze calculating unit
102 user information obtaining unit
103 high-image-quality area control unit
104 rendering buffer generating unit
105 rendering unit
106 transmitting unit

The invention claimed is:

1. An information processing apparatus, comprising:
a processor configured to:
obtain user information of a user, wherein
the user information is different from gaze information of the user,
the user information includes at least one of heartbeat information, sweating information, body temperature information, brain-wave information, or speed information of the user, and
the user information is detected by a sensor;
determine a central field of view of the user based on the user information;
determine whether the user information indicates a first state or a second state of the user, wherein an activity level of the user in the second state is higher than that in the first state;
set a size of a high-image-quality area in the second state smaller than that in the first state, wherein
a quality of an image displayed in the high-image-quality area is higher than a quality of an image displayed in an area other than the high-image-quality area in an entire display area; and
control display of the image in the high-image-quality area based on the central field of view.

2. The information processing apparatus according to claim 1, wherein the processor is further configured to determine a size of the central field of view based on the user information.

3. The information processing apparatus according to claim 1, wherein
the processor is further configured to determine an image quality of a surrounding area based on the user information, and
the surrounding area is the area of the entire display area excluding the high-image-quality area.

4. The information processing apparatus according to claim 3, wherein the processor is further configured to:
obtain the gaze information of the user;
calculate a point-of-gaze on the entire display area based on the gaze information; and
calculate a position of the high-image-quality area based on the point-of-gaze.

5. The information processing apparatus according to claim 4, wherein at least one of a resolution, a frame rate, a bit color, or a speed of the image displayed in the surrounding area is lower than at least one of a resolution, a frame rate, a bit color, or a speed of the image displayed in the high-image-quality area.

6. The information processing apparatus according to claim 5, wherein the processor is further configured to:
render a high-quality image in the high-image-quality area; and
render a low-quality image in the surrounding area.

7. The information processing apparatus according to claim 6, wherein the processor is further configured to:

change the at least one of the resolution, the frame rate, the bit color, or the speed of the image displayed in the surrounding area based on a type of a rendered image; and render the low-quality image in the surrounding area based on the change of the at least one of the resolution, the frame rate, the bit color, or the speed of the image displayed in the surrounding area.

8. The information processing apparatus according to claim 4, wherein the processor is further configured to:
calculate a position of a first high-image-quality area based on the point-of-gaze;
calculate a position of a second high-image-quality area based on a center point of the entire display area;
calculate a size of at least the first high-image-quality area based on the user information; and
calculate, as the high-image-quality area, an area including the first high-image-quality area and the second high-image-quality area.

9. The information processing apparatus according to claim 4, wherein the processor is further configured to:
calculate a position of a first high-image-quality area based on the point-of-gaze;
calculate a position of a second high-image-quality area based on a previous point-of-gaze;
calculate a size of at least the first high-image-quality area based on the user information; and
calculate, as the high-image-quality area, an area including the first high-image-quality area and the second high-image-quality area.

10. An information processing method, comprising:
obtaining user information of a user, wherein
the user information is different from gaze information of the user,
the user information includes at least one of heartbeat information, sweating information, body temperature information, brain-wave information, or speed information of the user, and
the user information is detected by a sensor;
determining a central field of view of the user based on the user information;
determining whether the user information indicates a first state or a second state of the user, wherein an activity level of the user in the second state is higher than that in the first state;
setting a size of a high-image-quality area in the second state smaller than that in the first state, wherein
a quality of an image displayed in the high-image-quality area is higher than a quality of an image displayed in an area other than the high-image-quality area in an entire display area; and
controlling display of the image in the high-image-quality area based on the central field of view.

11. A non-transitory computer-readable medium, having stored thereon, computer-executable instructions, which when executed by a computer, cause the computer to execute operations, the operations comprising:
obtaining user information of a user, wherein
the user information is different from gaze information of the user,
the user information includes at least one of heartbeat information, sweating information, body temperature information, brain-wave information, or speed information of the user, and
the user information is detected by a sensor;
determining a central field of view of the user based on the user information;
determining whether the user information indicates a first state or a second state of the user, wherein an activity level of the user in the second state is higher than that in the first state;
setting a size of a high-image-quality area in the second state smaller than that in the first state, wherein
a quality of an image displayed in the high-image-quality area is higher than a quality of an image displayed in an area other than the high-image-quality area in an entire display area; and
controlling display of the image in the high-image-quality area based on the central field of view.

12. The information processing apparatus according to claim 1, wherein the user information includes behavior information of a behavior of the user.

13. The information processing apparatus according to claim 1, wherein the user information includes environment information of an environment around the user.

* * * * *